US008948445B2

(12) United States Patent
Mow et al.

(10) Patent No.: US 8,948,445 B2
(45) Date of Patent: Feb. 3, 2015

(54) EMBEDDING VISUAL INFORMATION IN A TWO-DIMENSIONAL BAR CODE

(71) Applicant: Hong Kong University of Science and Technology, Hong Kong (CN)

(72) Inventors: Wai Ho Mow, Hong Kong (CN); Chi Yeung Au, Hong Kong (CN); Cheuk Yin Chiu, Hong Kong (CN); Ka Shun Li, Hong Kong (CN); Wenjian Huang, Hong Kong (CN)

(73) Assignee: The Hong Kong University of Science and Technology, Kowloon (HK)

( * ) Notice: Subject to any disclaimer, the term of this patent is extended or adjusted under 35 U.S.C. 154(b) by 90 days.

(21) Appl. No.: 13/886,028

(22) Filed: May 2, 2013

(65) Prior Publication Data
US 2013/0301870 A1    Nov. 14, 2013

Related U.S. Application Data

(60) Provisional application No. 61/687,877, filed on May 3, 2012.

(51) Int. Cl.
  *G06K 9/00*    (2006.01)
  *G06T 1/00*    (2006.01)
  (Continued)

(52) U.S. Cl.
  CPC ............. *G06T 1/0021* (2013.01); *G06T 1/0064* (2013.01); *G06K 7/1434* (2013.01); *G06K 19/06103* (2013.01); *G06T 2201/0051* (2013.01); *G06K 19/06037* (2013.01)
  USPC .......................................................... 382/100

(58) Field of Classification Search
  CPC ................ G06T 1/0021; G06T 1/0064; G06T 2201/0051; G06K 19/06037; G06K 19/06103; G06K 7/1434

USPC .......................................................... 382/100
See application file for complete search history.

(56) References Cited

U.S. PATENT DOCUMENTS 5,946,414 A    8/1999  Cass et al.
6,751,352 B1   6/2004  Baharav et al.
6,892,947 B1   5/2005  Jam et al.
(Continued)

OTHER PUBLICATIONS

Kim, et al. "Watermarking two dimensional data object identifier for authenticated distribution of digital multimedia contents", Signal Processing: Image Communication, published on Jul. 28, 2010, pp. 559-576, vol. 25, Published by Elsevier B.V.
(Continued)

*Primary Examiner* — Tom Y Lu
(74) *Attorney, Agent, or Firm* — Amin, Turocy & Watson, LLP

(57) ABSTRACT

A two dimensional barcode containing encoded information can be embedded with an image with a high visual quality. The encoded information within the barcode is meaningful to machines, while the image is meaningful to humans. The two dimensional barcode embedded with the image is designed such that machines can decode the information encoded within the two dimensional barcode even with the distortion from the image. The subject application describes various systems, methods and devices that can facilitate embedding the image within the two dimensional barcode, detecting the two dimensional barcode embedded with the image within a practical environment, and decoding the encoded information from the two dimensional barcode even with the distortion from the image.

20 Claims, 25 Drawing Sheets

(51) Int. Cl.
*G06K 7/14* (2006.01)
*G06K 19/06* (2006.01)

(56) References Cited

U.S. PATENT DOCUMENTS

| | | | |
|---|---|---|---|
| 7,207,491 B2 | 4/2007 | Lubow | |
| 7,991,198 B2* | 8/2011 | Zhao et al. | 382/112 |
| 8,144,922 B2* | 3/2012 | Kawabe et al. | 382/100 |
| 8,385,592 B2* | 2/2013 | Fisher et al. | 382/100 |
| 2006/0215931 A1* | 9/2006 | Shimomukai | 382/284 |
| 2007/0278305 A1 | 12/2007 | Komaki | |
| 2008/0061146 A1 | 3/2008 | Komaki | |
| 2011/0121069 A1 | 5/2011 | Lindahl et al. | |

OTHER PUBLICATIONS

Kato, et al., "Pervasive 2D Barcodes for Camera Phone Applications", Pervasive Computing, Published by IEEE Computer Society in Oct.-Dec. 2007, pp. 76-85, retrieved on Jul. 26, 2013, 10 pages.
Han, et al., "A Robust Digital Watermarking Adopting 2D Barcode", Published by Springer-Verlag Berlin Heidelberg 2005, pp. 717-723, retrieved on Jul. 26, 2013, 7 pages.
Hakola, et al., "Detection of printed codes with a camera phone", retrieved on Jul. 26, 2013, 7 pages.
Hof, "Logo Code: a Common Language Based on 2D Barcodes", Sprouts—Working Papers on Information Systems, ISSN 1535-6078, Published on Aug. 8, 2008, 3 pages.
Shapira, Lior. "QR code encode and decode" Published on Nov. 2, 2010 at [http://www.mathworks.com/matlabcentral/fileexchange/29239-qr-code-encode-and-decode], retrieved Aug. 5, 2013, 3 pages.
"Binary Distributions", Apache Ant JAVA library [http://ant.apache.org/bindownload.cgi], retrieved on Aug. 5, 2013, 3 pages.
"ZXing ("Zebra Crossing")", Multi-format 1D/2D barcode image processing library with clients for Android, Java [http://code.google.com/p/zxing/] retrieved on Aug. 5, 2013, 2 pages.
"OpenCV DevZone" for Android [http://code.opencv.org/projects/opencv/wiki/OpenCV4Android#Download] retrieved on Jul. 3, 2013, 1 page.
Android Developer Homepage [http://developer.android.com/index.html], retrieved on Jul. 3, 2013, 1 page.
Sony Ericsson Xperia™ mini pro [http://www.gsmarena.com/sony_ericsson_xperia_mini_pro-3713.php], retrieved on Aug. 5, 2013, 2 pages.
"RSCODE Project" [http://rscode.sourceforge.net/], retrieved on Jul. 3, 2013, 1 page.
Chiu, et al. "Detection Issues of Finder Patterns (in high resolution photo)" Google groups, [https//groups.google.com/forum/#!searchin/zxing/Detection$20Issues$20of$20Finder$20Patterns/zxing/PAQCurkoBNc/3hDvHgE4ImcJ] retrieved Aug. 2, 2013, 2 pages.
GS1 Data Matrix—An Introduction and technical overview of the most advanced GS1 Application Identifiers compliant symbology, [https://docs.google.com/viewer?url=http%3A%2Fwww.gs1.org%2Fdocs%2Fbarcodes%2FGS1_DataMatrix_Introduction_and_technical_overview.pdf] retrieved on Jul. 3, 2013, 39 pages.
"Character (JIS8 unit code: JIS X0201)" [http://www.asahi-net.or.jp/~EK5Y-NSMR/ref-ascii.htm] Translated page retrieved on Jul. 30, 2013, 1 page.
"Introduction to Reed-Solomon Codes" Highland Communications Technologies, [http://www.highlandcomm.com/reed_solomon_codes.htm] retrieved on Jul. 3, 2013, 3 pages.

* cited by examiner

EMBEDDING VISUAL INFORMATION IN A TWO-DIMENSIONAL BAR CODE

CROSS REFERENCE TO RELATED APPLICATION

This application claims priority to U.S. provisional application No. 61/687,877, entitled: "METHOD FOR EMBEDDING VISUAL INFORMATION IN TWO-DIMENSIONAL BAR CODES," and filed on May 3, 2012. The entirety of the provisional application is incorporated herein by reference.

TECHNICAL FIELD

This disclosure generally relates to a two dimensional barcode with a good visual quality image embedded within the two dimensional barcode, while retaining a reliable and robust decoding of information that is encoded in the two dimensional barcode.

BACKGROUND

In its simplest form, a barcode is a machine readable data representational label. The barcode can be used to identify an item fast and reliable identification by scanning devices for inventory control or logistics. Traditional bar codes are one dimensional and black and white in color. However, the modern barcodes are no longer restricted to a single dimension, black and white in color design. Barcodes can now be designed in two dimensions with various colors. Modern barcodes can offer enhanced data storage capability, responsiveness, robustness, as well as reliability compared to the traditional one dimensional, black and white counterpart.

In the market, several different two dimensional barcode designs exist, including QR (Quick Response) code designed by Denso Wave, Data Matrix code designed by International Data Matrix, and HCCB (High Capacity Color Barcode) designed by Microsoft, as well as others. Due to the higher storage capacity, data stored in modern two dimensional barcodes can include more than simple product identification. The data stored in a modern two dimensional barcode can include contact information, an e-mail address, a calendar event, a GPS (global positioning system) location, a SMS (short message service) text message, a website hyperlink, wireless network connection information, and the like, in addition to the product information. Modern two dimensional barcodes have gained widespread popularity and are employed in a wide range of commercial applications beyond inventory control and logistics.

Modern two dimensional barcodes (especially QR codes) can be used in mobile advertising applications as tools to attract potential customers' attention. For example, companies can attract potential customers' attention by use of two dimensional barcodes that are printed in newspapers or magazines. A potential customer can see the two dimensional bar code, take the photo snapshot of the barcode using a smart phone or tablet application software and retrieve the information encoded in the two dimensional barcode (e.g., special discount coupons).

Modern two dimensional barcodes can be used as marketing tools due to rapid advances in mobile technology. Most existing smart phones and tablets are equipped with high processing power, large memory storage, high quality built-in cameras, as well as multi-tasking capability. Different types of barcode mobile application software are available for smart phones or tablets to decode data stored in barcodes in a fast, efficient and reliable manner. The prevalence of smart phones and tablets and availability of inexpensive mobile barcode scanner application software allows for widespread adoption of barcoding technology, without requiring a specialized, bulky and expensive barcode scanner.

The above-described background is merely intended to provide an overview of contextual information regarding barcodes, and is not intended to be exhaustive. Additional context may become apparent upon review of one or more of the various non-limiting embodiments of the following detailed description.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some concepts of the specification in a simplified form as a prelude to the more detailed description that is presented later.

In accordance with one or more embodiments and corresponding disclosure, various non-limiting aspects are described in connection with a two dimensional barcode that provides a good visual quality image, which is meaningful to humans, integrated with the two dimensional barcode, which is meaningful to machines. The image is embedded within the two dimensional barcode such that the two dimensional barcode retains the ability for machines to undertake a reliable and robust decoding of information that is encoded in the two dimensional barcode even with the distortion from the image. The subject application describes various systems, methods and devices that can facilitate embedding the image within the two dimensional barcode, detecting the two dimensional barcode embedded with the image within a practical environment, and decoding the encoded information from the two dimensional barcode even with the distortion from the image.

Embedding (or encoding) the image within the two dimensional barcode is described in an aspect or embodiment herein. Specifically, a system is described that can facilitate the embedding of the image within the two dimensional barcode. In other words, the system can facilitate watermarking the two dimensional barcode with the image. The system includes a memory to store computer-executable instructions and a processor that executes or facilitates execution of the computer-executable instructions. Operations that occur upon execution of the computer-executable instructions include at least: encoding a message within a two dimensional barcode; embedding a gray scale image into the two dimensional barcode via a watermarking technique employing at least two tiling patterns; and adding a finder pattern and a quiet zone to the two dimensional barcode with the embedded image. Corresponding methods and computer readable devices are also described.

Detecting the two dimensional barcode with the embedded image is described in another aspect or embodiment herein. A method is described that can facilitate the detecting of the two dimensional barcode with the embedded image. The method includes: generating, by a system comprising a processor, a binary image based on an image comprising a two dimensional barcode embedded with visual information; locating, by the system, a finder pattern within the binary image; and performing, by the system, a perspective transformation in two dimensions of the binary image based on the finder pattern. Corresponding systems and computer readable devices are also described.

Decoding a message encoded into the two dimensional barcode is described in a further aspect or embodiment herein. A computer readable storage device is described that comprises computer-executable instructions that, in response to execution, cause a system comprising a processor to perform operations. The operations can facilitate decoding of the message encoded into the two dimensional barcode. The operations include separating a bit stream of a watermark from a two dimensional barcode; and decoding content represented by the two dimensional barcode according to a Reed-Solomon detection algorithm. Corresponding systems and methods are also described.

The following description and the drawings set forth certain illustrative aspects of the specification. These aspects are indicative, however, of but a few of the various ways in which the various embodiments of the specification may be employed. Other aspects of the specification will become apparent from the following detailed description of the specification when considered in conjunction with the drawings.

BRIEF DESCRIPTION OF THE DRAWINGS

Numerous aspects and embodiments are set forth in the following detailed description, taken in conjunction with the accompanying drawings, in which like reference characters refer to like parts throughout, and in which.

DETAILED DESCRIPTION

Figure 1:
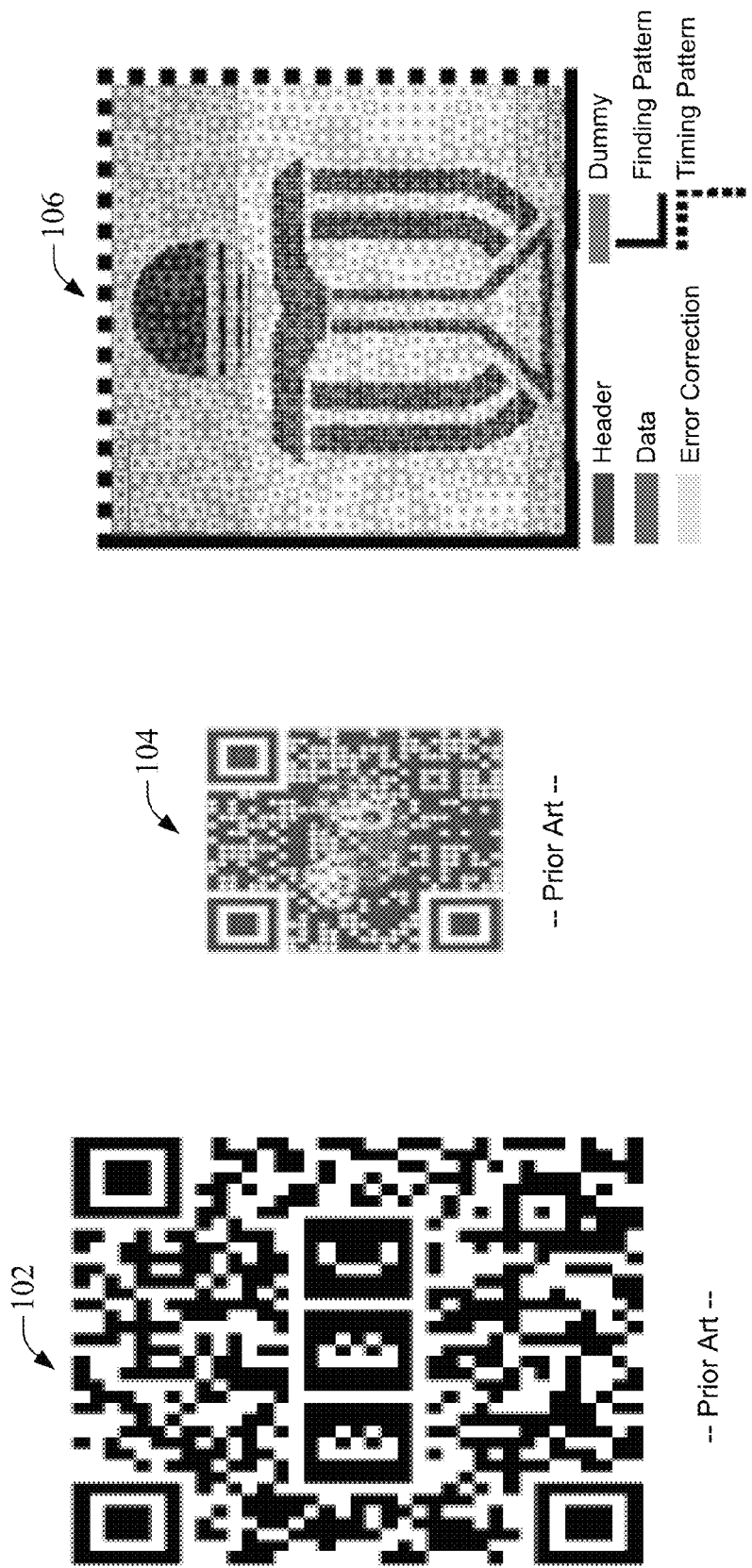
FIG. 1 is an example non-limiting illustration comparing different types of two dimensional barcodes with images included within the barcode, according to an aspect of embodiment of the subject disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that the certain aspects of disclosure may be practiced without these specific details, or with other methods, components, molecules, etc. In other instances, well-known structures and devices are shown in block diagram form to facilitate description and illustration of the various embodiments.

The subject application is generally related to the design and use of a visually attractive two dimensional barcode. Systems and methods described herein improve the aesthetic appearance of two dimensional barcodes via the incorporation of an image within the two dimensional barcode. In this application, the terms "image," "visual information," "logo," or the like are used interchangeably. Additionally, the terms "incorporation," "incorporated," "embedding," "embedded," or the like are generally utilized interchangeably to mean embedded within the two dimensional barcode (similar to a watermark).

Two dimensional barcodes are often black and white square blocks. While the blocks are meaningful to machines, the blocks have little visual appeal or meaning for humans, which can potentially decrease the effectiveness of the advertising implemented within the two dimensional barcodes. A two dimensional barcode can become more meaningful to a human with a logo of a company, product or brand incorporated within the two dimensional barcode. Additionally, the incorporated logo can increase advertising benefits of the two dimensional barcode because when taking a snapshot photo of the barcode, a person will naturally stare at the logo.

Companies have recognized the benefits of including an image within the two dimensional barcode. Several simplistic methods have been developed to facilitate display of an image within the two dimensional barcode. The simplistic methods generally include replacing (or corrupting) some area of the two dimensional barcode by the image (e.g., a logo or other visual information). Bar code decoding applications generally are equipped with some built-in error correction. The error correction allows for barcodes with small corrupted areas to be decoded successfully, as long as the corrupted areas are small enough to be within a tolerance level of the error correction algorithm used within the bar code decoding application. In other words, the size of the image must occupy a relatively small fraction of the whole barcode area, or else the barcode cannot be successfully decoded due to the large amount of distortion introduced by the image.

Due to inherent error correction algorithms of bar code decoding applications, the image utilized within a bar code by replacing or corrupting pixels generally needs to be quite small, which can reduce the aesthetic appearance of the image. Accordingly, the modified barcode with a small (even unreadable) image can make the barcode less appealing to humans. In instances where the image is a generally recognizable logo representing a high-quality brand, when the logo is included within the barcode, the logo may be degraded to an unacceptable level. Moreover, the image can decrease the success decoding rate for the modified bar codes. In fact, the addition of noise, distortion or contamination due to the image can become unacceptably low. To allow for sufficient decoding accuracy, the size of the embedded logo may need to be further reduced.

Different approaches to embedding an image into a two dimensional barcode are shown in FIG. 1. One approach of embedding an image into QR code is shown in element 102, where a BBC (British Broadcasting Company) logo is embedded within a QR code. Another approach of embedding an image into a QR code is shown in element 104, which is an example of an image embedded via the Logo Q technique. An image embedded into a two dimensional barcode according to the aspects and embodiments described herein is shown at element 106.

One approach of embedding a company logo into QR code was developed by Duncan Robertson (embedding a BBC logo into a QR barcode at a low resolution shown in element 102, other barcodes using similar methods to embed logos or cartoons into a QR barcode at low resolution exist). In the BBC example, to promote BBC TV programs, the QR barcodes with the BBC logo 102 are printed on posters, magazines and in newspapers to attract a reader's attention to scan the code and get the latest information about various TV programs. Accordingly, when a user scans the QR barcode with the BBC logo, the user is redirected to a specific TV program's website.

This approach takes advantage of the QR barcode's high error correction ratio. Using the Reed-Solomon error correction coder in the QR barcode, the encoded message can be detected and errors within can be corrected if the data are wrongly received. In the QR barcode, the highest error correction ratio is 30%. In other words, data is still recoverable if 30% of the data in the barcode is corrupted. The high error correction ratio of the QR barcode was designed to increase noise resistant power so that the barcode can remain readable when the barcode is partially scratched or destroyed in an extreme environment.

The BBC logo inside the QR barcode is meaningful to humans, but not to machines. Machines decoding the barcode consider the BBC logo to be noise or unwanted information. Using the error correction properties, information can be detected and restored. Since the noise and useless information of the BBC logo is added to the barcode intentionally, the noise resistant power will be greatly decreased, potentially resulting in failure during decoding. Also, the area of the logo inside the barcode is limited to less than 30% of the total barcode data area, or else the data cannot be decoded.

Another approach of embedding a company logo into QR code (Logo Q) was developed by A.T. Communications Ltd. (an example barcode created using this approach is shown at element 104). Logo Q is designed to embed logos or cartoon characters directly into a QR barcode with color. The visual effect is improved compared to the visual effect of the BBC logo 102 example. By carefully selecting logo and background colors and keeping the colors distinct (e.g., yellow image and blue barcode in the example shown in element 104), the QR barcode can be decoded with the majority of normal QR barcode detectors. Unlike the BBC logo 102 example, Logo Q does not cover the QR code with the logo. Instead, Logo Q is more like watermarking the QR barcode with the image. Most of the data blocks are still seen from the barcode, but some details, such as edges and logo edges are blurred and possibly will be errors during decoding.

Element 106 is an example of a two dimensional barcode with an image embedded according to the aspects and embodiments described herein. The visually attractive two dimensional barcode 106 described herein reduces or eliminates the likelihood of errors during decoding compared to both the BBC logo 102 example and the Logo Q 104 example. The two dimensional barcode 106 described herein generally utilizes a spread spectrum watermarking technique to facilitate embedding of the image within the barcode. The data within the barcode is represented by some spreading/tiling patterns of two dimensions. Compared to both the BBC logo 102 example and the Logo Q 104 example, the two dimensional barcode 106 described herein increases visual effect and visibility of the image within the barcode, while keeping the regular two dimensional barcode advantages, such as robustness and reliability.

The image in element 106 is an image of a logo. However, the image could also be an image (e.g., photograph) of a human face. According to an embodiment, an image of a human face can be embedded in the barcode (e.g., into the barcode shown in element 106 instead of the logo). Embedding an image of the human face in the barcode can allow for a certain degree of authentication or verification of the identity of the barcode user. For example, the image can discourage others from simply taking a photo of the barcode and using the message embedded within the barcode). Example applications include the barcode representation of an e-membership card, a barcode-based e-payment system, a barcode-based security system (e.g., for medical records), and the like.

Figure 1A:
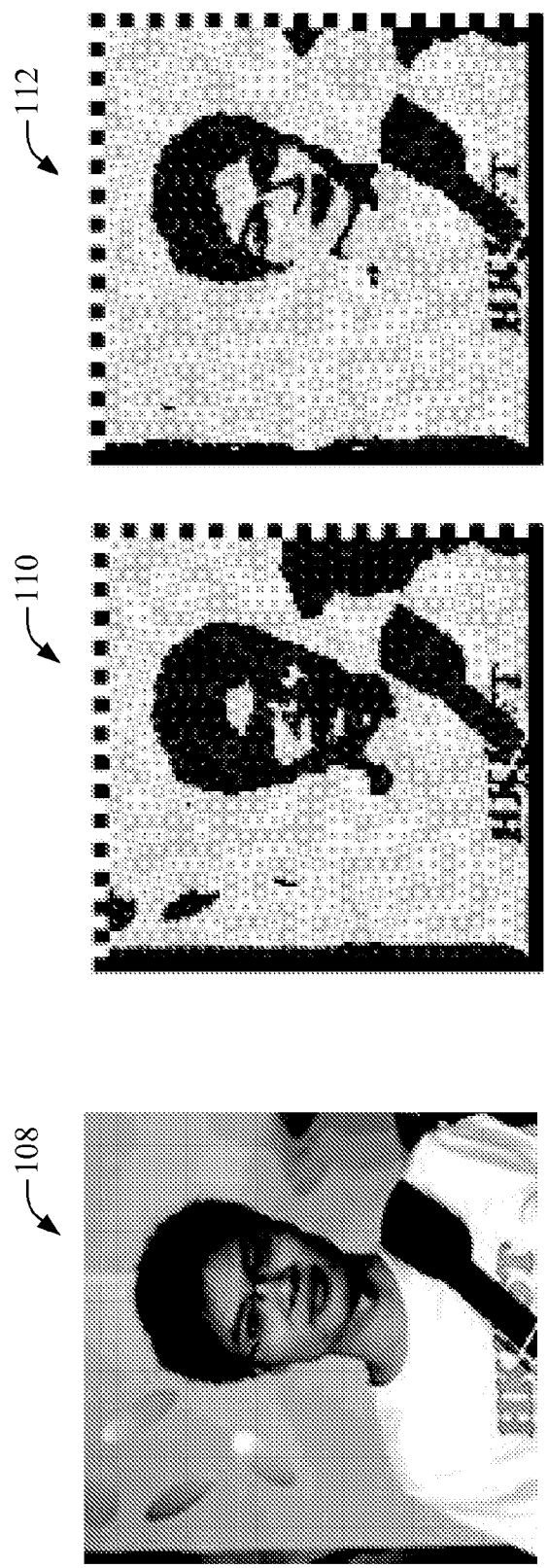
FIG. 1a is an example non-limiting illustration of an example of the image being a human face, according to an aspect or embodiment of the subject disclosure.

An example of the image being a human face is shown in FIG. 1*a*. The original face photo 108 can be embedded in the barcode. Element 110 shows the face embedded in the barcode without face enhancement pre-processing and element 112 shows the face embedded in the barcode with face enhancement pre-processing.

Parts of the picture directly embedded in the barcode in element 110 may sometimes have a very low quality so that it may be difficult to recognize a person's face and identity. This can be caused due to a low contrast, a similar background color, or the like. Element 112 shows a clarified image that is easier to recognize the person's face and identity. The face image (or photograph) can be pre-processed before being embedded in the barcode to increase the contrast and overall visual quality of the human face within the barcode.

With regard to element 112, the contrast of the face was selectively enabled, improving the visual quality of the resultant face embedded in the barcode. The main idea of the pre-processing is to identify the human face region of the photo by its typical color. In typical face photos, the face region lies in the middle of the histogram of gray level distribution. Additionally, the face region is usually closer to a certain yellow color, which means that in the RGB domain, the G and B components are relatively bigger than the R component. Therefore, the image can be searched for regions of pixels that satisfy the color condition that the G and B components have a greater contribution than the R component. The contrast is improved in these regions of the original image by rescaling the intensity. In other words, scaling up the higher intensity and scaling down the lower intensity.

An example of the face enhancement method is illustrated below. However, it will be understood that other methods can be used depending on the coloration of the face and other factors.

The color image of the face can be converted into a gray scale (or gray level) image. A histogram of gray level distribution within the gray level image can be generated. Histogram equalization can be performed on the histogram of gray level distribution. The searching range can be reduced to a middle intensity level (e.g., corresponding to the set from 20% to 80% of the maximum gray level). Then, a search can be conducted for pixels satisfying the color condition and are close to the yellow color of a face (e.g., $P_G > P_R * 1.1$ & $P_B > P_R * 1.1$, $\min(P_G, P_B) > 1.1 * P_R$, where $P_R$, $P_G$, $P_B$ in [0,255] represent the intensity levels of the respective R, G and B components of a pixel.)

The intensity of the pixels satisfying the color condition within the original image can be increased so as to increase the contrast. In other words, make the contrast even higher, and make the low intensity even lower. For example, if $I >= 100$, set $I' = \min(\text{ceil}(I*1.3), 255)$, otherwise, set $I' = \text{floor}(I*0.7)$, where I denotes the intensity level in the equalized histogram and I' denotes the intensity level after the enhancement.

Referring again to FIG. 1, the design and use of the two dimensional barcode 106 described herein can be separated into three different areas. "Encoding" generally refers to the design and generation of the two-dimensional barcode 106. "Detection" generally refers to acquiring an image of the two dimensional barcode 106 within a practical environment. "Decoding" generally refers to obtaining the message from the image of the two dimensional barcode.

Each of "encoding," "detection" and "decoding" can employ various components, application, services, systems, and the like. As utilized herein, terms "application," "service," "system," "component," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

In addition, the applications, services, systems, components, and the like can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable device. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable devices.

Encoding

Figure 24:
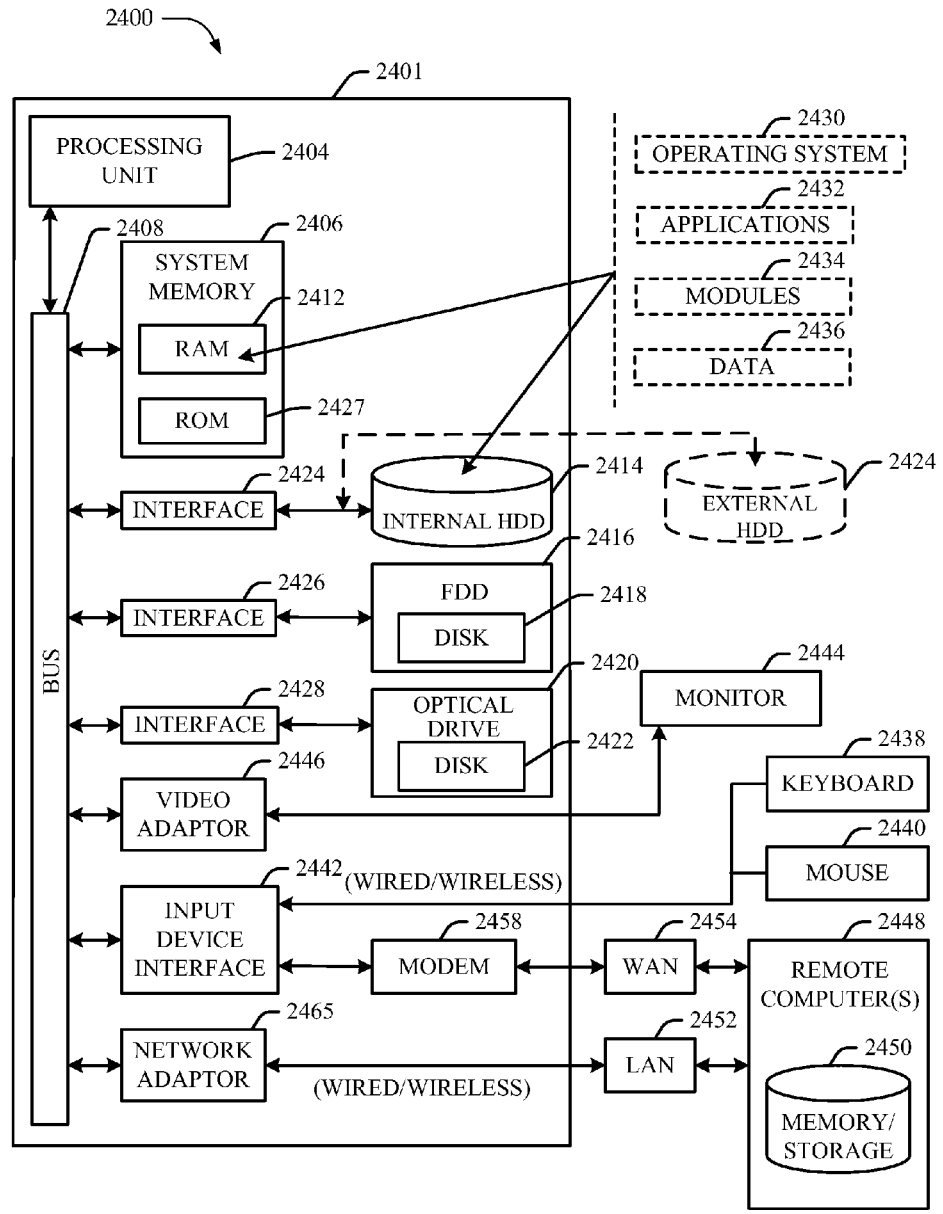
FIG. 24 is an example non-limiting schematic diagram of an example computer operable to execute a system architecture that facilitates implementations of the aspects and embodiments described herein.

The systems and methods that facilitate the encoding can generally be implemented by a computing device (e.g., as shown in FIG. 24). The systems and methods can employ a programming environment to facilitate the encoding. In general, any programming language and/or environment can be employed to facilitate the encoding.

Figure 2:
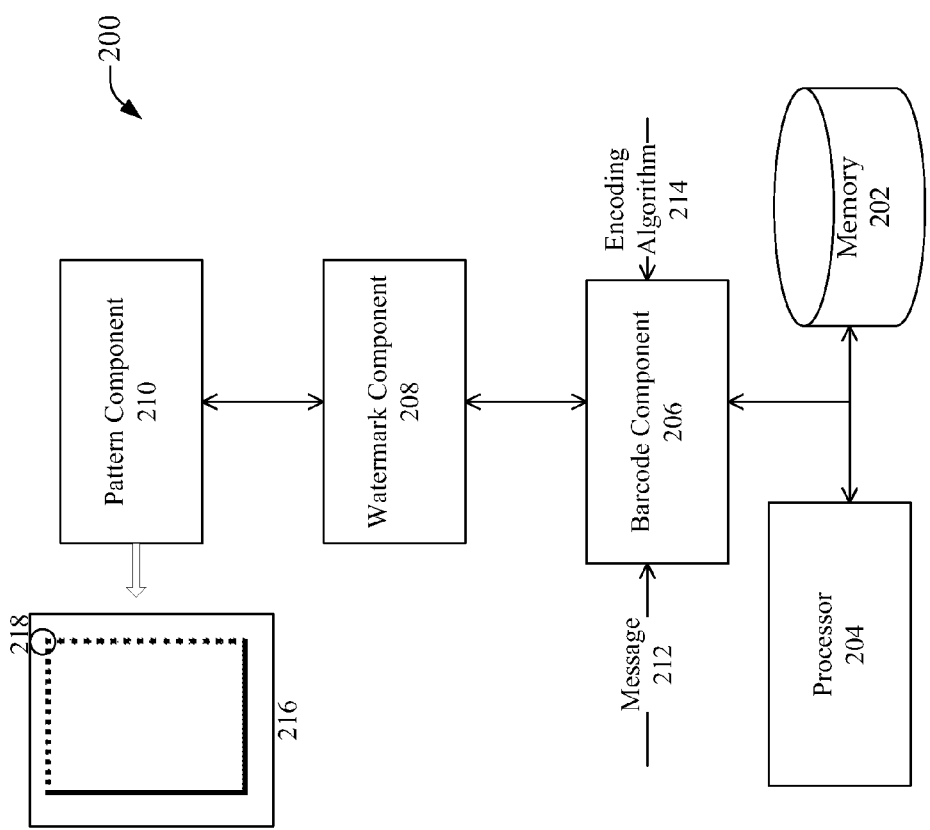
FIG. 2 is an example non-limiting schematic diagram of a system that facilitates encoding an image within a two dimensional barcode, according to an aspect or embodiment of the subject disclosure.

Referring now to FIG. 2, illustrated is an example non-limiting schematic diagram of a system 200 that facilitates encoding (or modulating) an image within a two dimensional barcode, according to an aspect or embodiment of the subject disclosure. System 200 includes a memory 202 that can store instructions, components, or the like. System 200 also includes a processor 204 that can facilitate execution of the instructions, components, or the like to facilitate the performance of various operations associated with the instructions, components, or the like. The memory 202 and processor 204 can be the memory and processor of a single computing device or distributed throughout a network of computing devices across a network.

System 200 includes various components that can facilitate encoding an image within a two dimensional barcode. System 200 can facilitate an encoding of a message within a two dimensional barcode. After the message is encoded within the two dimensional barcode, system 200 can facilitate embedding a gray scale image into the two dimensional barcode via a watermarking technique employing at least two tiling patterns. When the image is embedded within the barcode, system 200 can facilitate adding a finder pattern and a quiet zone to the two dimensional barcode with the embedded image.

For example, system 200 can include a barcode component 206, a watermark component 208 and a pattern component 210 that are each stored in the memory 202 and the processor 204 executes or facilitates the execution of the components 206, 208 and 210. The barcode component 208 can encode a message 212 within a two dimensional barcode. The watermark component 208 can embed a gray scale image into the two dimensional barcode via a watermarking technique employing at least two tiling patterns. The pattern component 210 can add a finder pattern and a quiet zone 216 to the two dimensional barcode with the embedded image.

The barcode component 208 encodes the message 212 within the two dimensional barcode according to an encoding algorithm. The message 212 is generally a text message that can be imputed by a user creating the two dimensional barcode. The text message can include characters, including letters, numbers, punctuation, symbols, or the like. The text message can be limited to a certain number of characters based on limitations related to the two dimensional barcode. In an example, the number of characters can be limited to less than 100 characters. In another example, the number of characters can be limited to less than 75 characters. In a further example, the number of characters can be limited to less than 50 characters.

The message 212 can be any type of text message. For example, the message 212 can be a link to a website associated with a company, product, character or the like represented by the image embedded within the two dimensional barcode. The message 212 can also be a text message offering a reward for scanning the barcode (e.g., a discount). The message 212 can also be a message regarding the company, product, character, or the like represented by the image embedded within the two dimensional barcode.

The message 212 cannot be transmitted out of the two dimensional barcode without being encoded within the two dimensional barcode by the barcode component 206. The barcode component 206 generally encodes the message 212 within the barcode according to an encoding algorithm 214. The encoding algorithm 214 can capture the text message, check that the length of the text message is less than a character limit, if the length is less than the character limit, the text message can be converted to a binary data format. The binary text message can be included in a header.

Characters of the text message can be translated into another format defined by a character encoding library. Different languages have their own encoding scheme/standard. For example, for English characters, the commonly used standard is ASCII (American Standard Code for Information Exchange). For Chinese characters, the commonly used standard is Big-5. Other standards exist for other languages. The characters of the text message can be translated into any other format defined by any type of character encoding library.

Utilizing the library, individual characters within the text message can be encoded into a binary data codeword of a certain number of bits (e.g., 8 bits). After the text message is encoded, a header and terminator are placed at the front and at the end of the encoded message. The header can indicate to a decoder the number of characters in the message. The terminator operates to ensure that the decoder will not read anything exceeding the length of the encoded bits.

In an example, the maximum amount of characters allowed within the text message is 34. Translating it in to binary form, the header occupies at most 6 binary bits. The terminator is 4 binary bits used to indicate the end of the encoded message (e.g., "000").

Anticipating that errors will be introduced during transmission of the two dimensional barcode (e.g., by the environment or the channel) that will corrupt data and make decoding the message fail, the encoding algorithm 214 can employ an error correction code to protect the data. The error correction code can be any type of error correction code that can detect errors and correct them. One example of an error correction code is a Reed-Solomon error correction code.

The error correction code can detect and correct multiple symbol abnormalities, including erasure and error. Erasure generally refers to an erroneous symbol in a codeword with a known location. Error generally refers to an erroneous symbol in a codeword with an unknown location.

Since the two dimensional barcode described herein (e.g., the two dimensional barcode shown at element 106 of FIG. 1) has an image embedded within the two dimensional barcode, interference in addition to the display-camera channel noise is introduced when an image of the two dimensional barcode is taken within the detection stages. A symbol in a known location corrupted by strong interference is likely to be in error and may be declared as an erasure, and hence both erasures and errors can occur. The number of errors and erasures that can be corrected (depending on the number of error correction symbols used) is given by:

$$2t+e \leq n-k,$$

where t is the number of errors, e is the number of erasures, n is the number of total symbols, k is the number of data symbols and (n−k) is the number of error correction symbols. The number of erasures that can be corrected are twice the number of errors that can be corrected.

The maximum length of a Reed Solomon code is:

$$N=2^m-1,$$

where m is the number of bits per symbol. For example, if m=8, the maximum length $N=2^8-1=255$. Since the two dimensional barcode is not able to place all 255 symbols, zeroes can be padded to the two dimensional barcode to make the overall length 255 before error correction encoding.

For example, for an 8 bit Reed-Solomon code, with 120 data symbols, aiming to correct up to 10 errors, and 20 error correction symbols is shorter than 255. Accordingly 115 zeroes can be padded into the data symbols, such that 235 symbols are encoded. After the data is encoded, the padded zeroes are removed and placed after the terminator. When the data is decoded, the removed zeroes are padded in the same way.

After the message 212 is encoded within the two dimensional barcode, the watermark component 208 can embed a gray scale image into the two dimensional barcode via a watermarking technique employing at least two tiling patterns. The gray scale image can be an image with color removed before it is embedded within the barcode. The image can be any type of image, such as a logo, a picture, a cartoon character, or any other type of image.

If the image has a complication shape or a shape with many edges, the image may hamper the eventual decoding process of the message 212 within the two dimensional barcode. In this case, the resolution of the image can be decreased to facilitate success in the eventual decoding process. The image can be of any format, including "bmp," "gif," "jpeg," "tiff," or any other format. However, in an embodiment, the "bmp" format is preferred.

Figure 3:
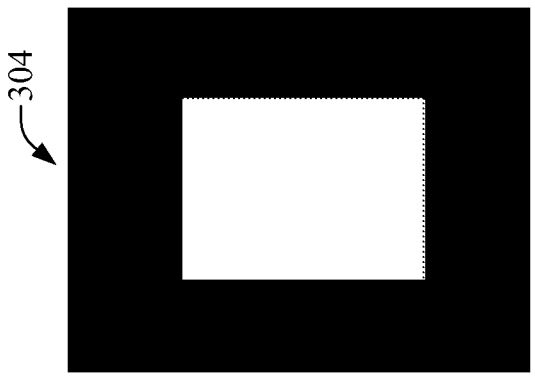
FIG. 3 is an example non-limiting schematic diagram of example tiling patterns that can facilitate the encoding the image within the two dimensional barcode, according to an aspect or embodiment of the subject disclosure.
Figure 3:
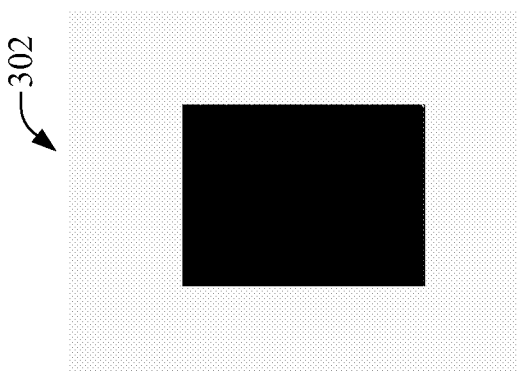

Tiling patterns are generally any pre-defined pattern that can be used to represent data "0" and data "1" in the calibration of the image. Examples of tiling patterns 302 (representing data "0"), 304 (representing data "1") are shown in FIG. 3. Using tiling patterns in the embedding process calibrates the gray level of the image without allowing the gray level to be changed by the camera with different threshold values. Using tiling patterns, a decoder can determine whether the data is "0" or "1" by comparing the image to the tiling patterns without using a threshold. Accordingly, reliability is increased and less processing work is required. The tiling patterns are not limited to the patterns 302 and 304. The tiling patterns can be any patterns of pseudorandomly positioned sub-blocks. Additionally, although two tiling patterns are shown, it will be understood that more than two tiling patterns can be utilized.

In an embodiment, to embed an image within the two dimensional barcode, the watermark component 208 can re-size the image so that it is of a size 116 pixels×116 pixels. The watermark component 208 can make the image into a gray scale image by removing color from the image. The watermark component 208 can embed the gray scale image into the two dimensional barcode as follows. The gray scale image (size 116 pixels×116 pixels) can be split into blocks representing a single bit of data. The size of the block can be 4 pixels×4 pixels with either the tiling pattern representing data "0" (e.g., 302) or the tiling pattern representing data "1" (e.g., 304). The total number of available blocks is 841. The last 6 blocks are reserved for 6 bits of header redundancy.

Figure 4:
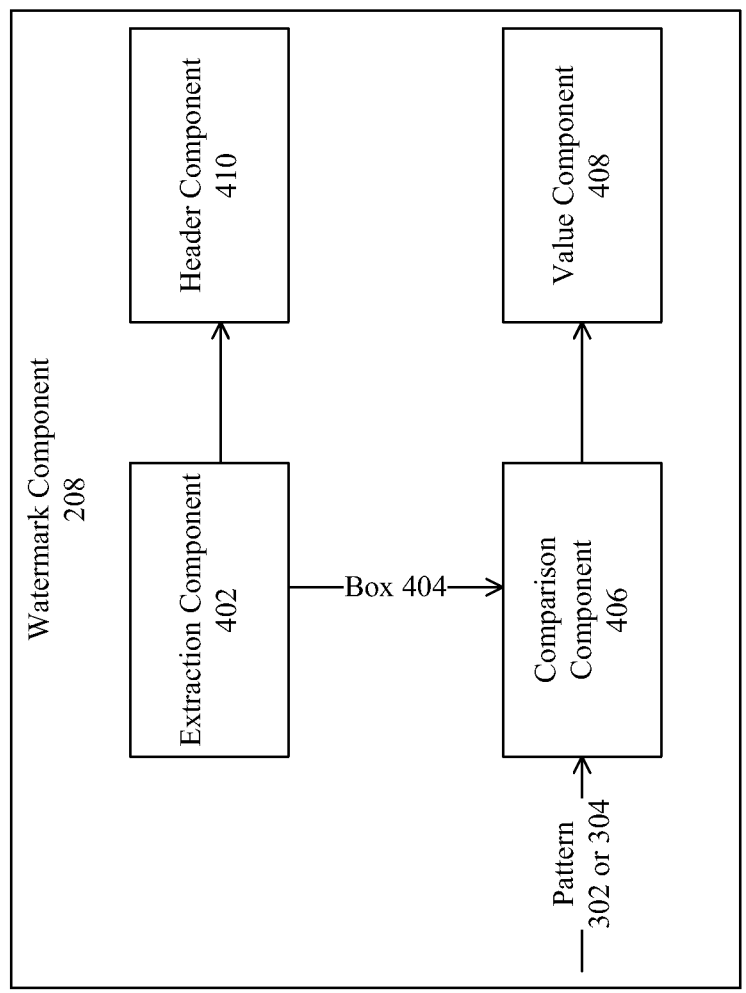
FIG. 4 is an example non-limiting schematic diagram of the watermark component that can facilitate the encoding the image within the two dimensional barcode, according to an aspect or embodiment of the subject disclosure.
Figure 5:
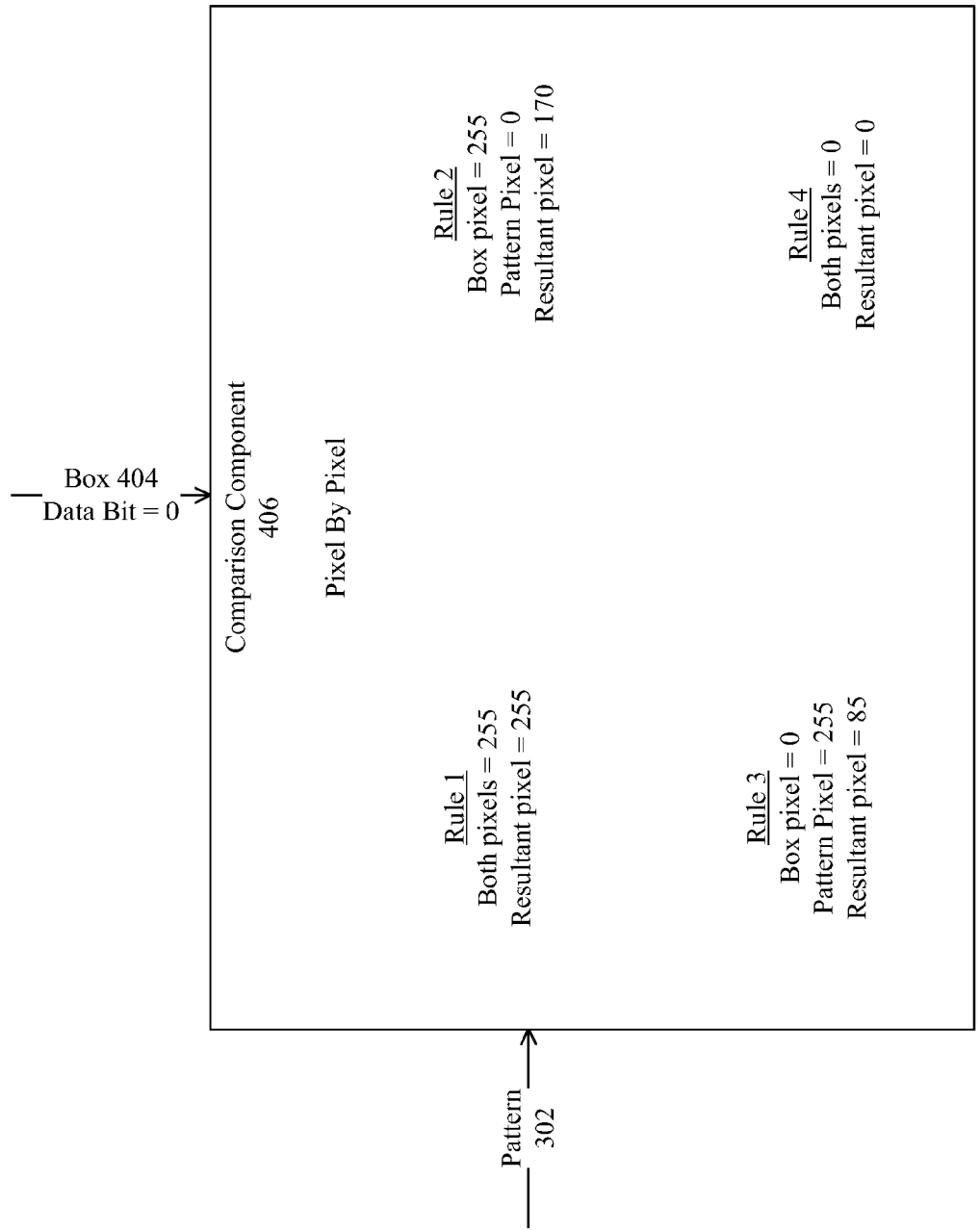
FIGS. 5 and 6 are example non-limiting schematic diagrams of the comparison component that can facilitate the encoding the image within the two dimensional barcode, according to an aspect or embodiment of the subject disclosure.
Figure 6:
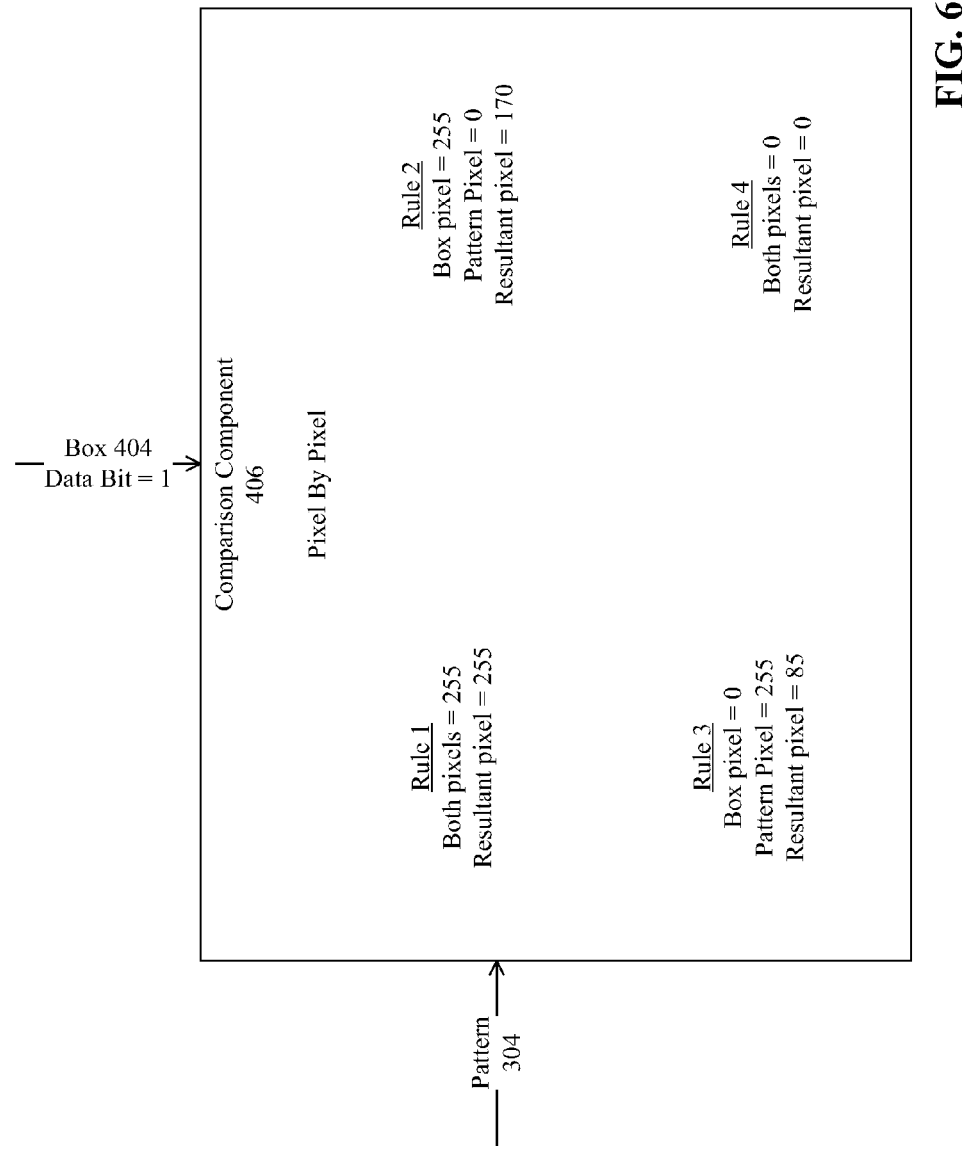

An illustration of the watermark component 208 is shown in FIG. 4. The watermark component 208 can include an extraction component 402, a comparison component 406, a value component 408 and a header component 410. The extraction component 402 can extract a block 404 that represents a bit of data from the gray scale image. The comparison component 406 can determine whether the block is data "0" and data "1" and can compare pixels within the box 404 to corresponding pixels within the pattern 302 or 304 depending on whether the block is data "0" or data "1." FIGS. 5 and 6 illustrate the rules that are used by the comparison component 406 when comparing the pixels within the block 404 to the pixels within the pattern 302. The value component 408 can set a value for the pixels within the block based on the comparison by the comparison component 406. The header component 410 reserves a portion of the gray scale image (e.g., six boxes 404) for header data related to the message. The watermark component 208 as shown in FIG. 4 facilitates the embedding of the gray scale image into the two dimensional barcode.

As shown in FIGS. 5 and 6, the comparison component 406 uses four major rules in a pixel by pixel comparison of each block to determine a value of the corresponding pixel in the final two dimensional barcode with the embedded image. If the bit of the encoded data is 0, compare extracted block with tiling pattern 302. If the bit of the encoded data is 1, compare extracted block with tiling pattern 304 according to the following rules:

Rule 1: Pixel of both blocks is high intensity (e.g., 255), the pixel of the same position of the final barcode is high intensity (e.g., 255).

Rule 2: Pixel of extracted block is high intensity (e.g., 255), pixel of tiling pattern is low intensity (e.g., 0), the pixel in the same position of the final barcode is a second high intensity (e.g., 170).

Rule 3: Pixel of extracted block is low intensity (e.g., 0), pixel of tiling pattern is high intensity (e.g., 255), the pixel in the same position of the final barcode is a second low intensity (e.g., 85).

Rule 4: Pixel of both blocks is low intensity (e.g., 0), the pixel in the same position of the final barcode is low intensity (e.g., 0).

The comparison is repeated until all blocks of the image are embedded within the barcode. If any remaining blocks, the process will restart from the first bit of the data. The last (e.g., 6) reserved blocks are embedded with the corresponding number of bits (e.g., 6 bits) of header for redundancy.

After completion of the embedding of the image within the two dimensional barcode, the pattern component 210 adds a finder pattern and a quiet zone 216 to the two dimensional barcode with the embedded image. The pattern component 210 can also add a finder pattern. The finder pattern in element 216 is the box of a solid line and a dashed (broken line). The broken line can act as a timing pattern that is used to locate the coordinates of the blocks in the barcode and to estimate the physical size of the barcode. However, the finder pattern can be any pattern that can facilitate location of the barcode and measuring of the size of the barcode during the detection of the barcode. For example, the finder pattern can be any kind of finder pattern, as long as the four corners of the finder pattern appear.

The finder pattern can also be utilized to minimize the incorrect detection of the barcode (or fault detection). An example of the finder pattern of element 216 is different from a traditional Data Matrix finder pattern, adding an extra box 218 in the broken line in the top right hand corner of the finder pattern. The corrected top right corner reduces the risk of an improper transformation when the barcode image is skewed. The Data Matrix code standard requires the number of blocks (or modules) on the vertical and horizontal axis to be even. In the finder pattern described herein, the number of blocks (or modules) on the vertical and horizontal axis are odd. Accordingly, the top right corner becomes a black module (extra block 218) instead of a white module.

The quiet zone is the surrounding white space around the finder pattern. The finder pattern can help in the detection and transformation of the two dimensional barcode to the correct position before decoding the message. The quiet zone can isolate the barcode from the outside environment to avoid distraction during barcode detection. For example, the border width of the finder pattern can be 4 pixels and the width of the quiet zone can be 8 pixels.

Figure 7:
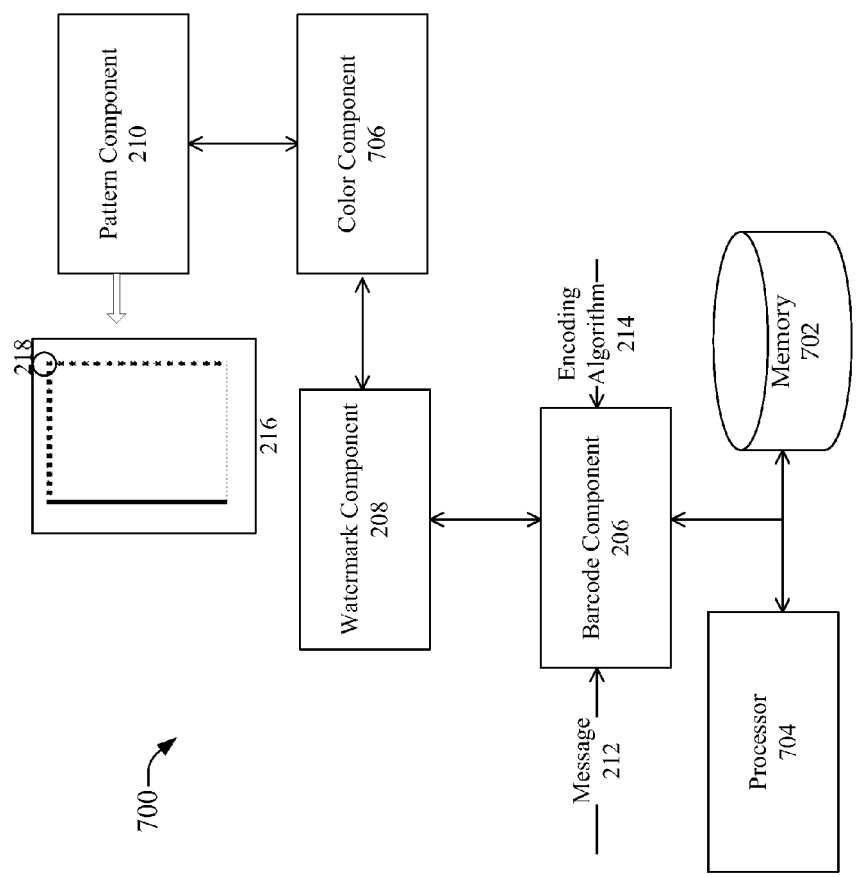
FIG. 7 is an example non-limiting schematic diagram of a system that facilitates colorizing a two dimensional barcode with an embedded image, according to an aspect or embodiment of the subject disclosure.

Referring now to FIG. 7, illustrated is an example non-limiting schematic diagram of a system 700 that facilitates colorizing a two dimensional barcode with an embedded image, according to an aspect or embodiment of the subject disclosure. System 700 includes a memory 702 that can store instructions, components, or the like. System 700 also includes a processor 704 that can facilitate execution of the instructions, components, or the like to facilitate the performance of various operations associated with the instructions, components, or the like. The memory 702 and processor 704 can be the memory and processor of a single computing device or distributed throughout a network of computing devices across a network.

System 700 includes various components that can facilitate colorizing a two dimensional barcode with an embedded image. System 700 can facilitate an encoding of a message within a two dimensional barcode. After the message is encoded within the two dimensional barcode, system 700 can facilitate embedding a gray scale image into the two dimensional barcode via a watermarking technique employing two tiling patterns. After the image is embedded within the barcode, the image and barcode can be colorized. When the image embedded within the barcode is colorized, system 700 can facilitate adding a finder pattern and a quiet zone to the two dimensional barcode with the embedded image.

For example, system 700 can include the barcode component 206, the watermark component 208 and the pattern component 210 with the same functionalities as described with respect to FIG. 2 above. System 700 also includes a color component 706 that can colorize the image embedded within the two dimensional barcode. The color component 706 can colorize the image embedded within the two dimensional barcode after the embedding by the watermark component 208 and before the addition of the finder pattern and the quiet space (element 216).

Figure 8:
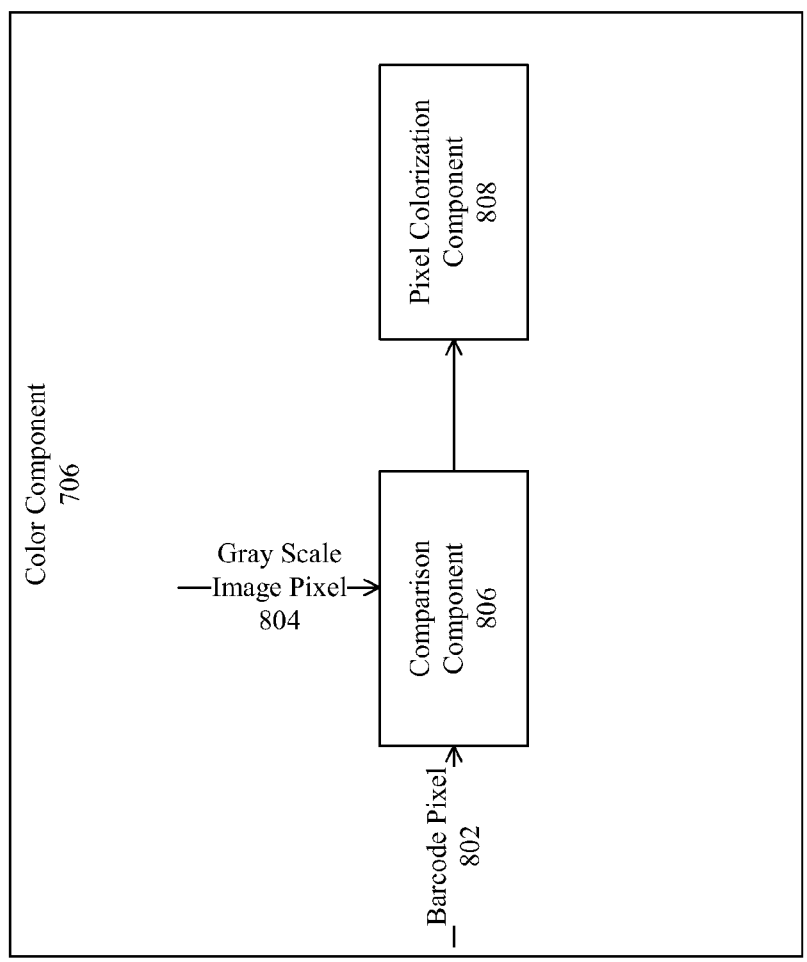
FIG. 8 is an example non-limiting schematic diagram of the color component that can facilitate colorizing the encoded image within the two dimensional barcode, according to an aspect or embodiment of the subject disclosure.

The color component 706 is shown in greater detail in FIG. 8. The color component 706 has a comparison component 806 that compares a pixel of the barcode 802 with a pixel of the gray scale image 804 and a pixel coloration 808 that colorizes each pixel based on the comparison.

The comparison component 806 provides a pixel by pixel comparison that follows the following rules:
- Rule 5: If both pixels are low intensity (e.g., 0), then set the pixel of the color barcode to be low intensity (e.g., 0).
- Rule 6: If pixel from the gray scale image is low intensity (e.g., 0) and the extracted pixel of the barcode is not zero, set the pixel of the color barcode to be a secondary low intensity (e.g., 92).
- Rule 7: Otherwise drive a multiple between the two pixels and calculate the pixel of the final barcode by dividing the multiple.
- Multiple=pixel from gray scale image/pixel from gray scale two dimensional barcode (This formula is just an example formula for calculation of the Multiple. Other formulas may be used to calculate the Multiple.)

Pixel of Final Barcode=Pixel from color image/Multiple

Figure 9:
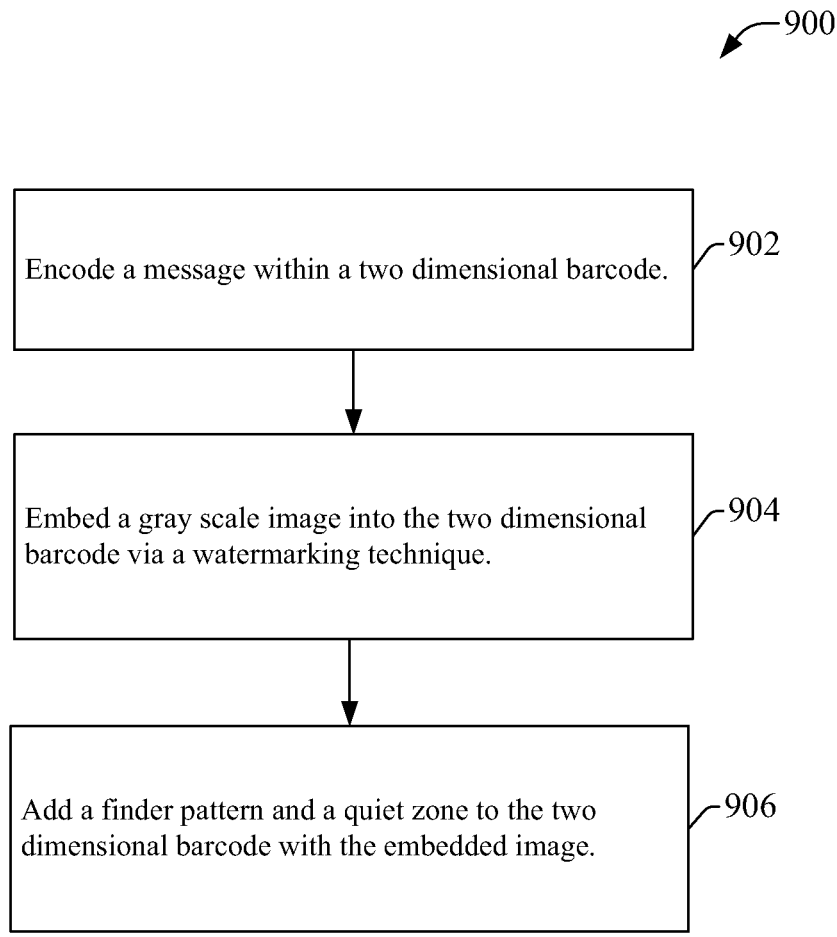
FIG. 9 is an example non-limiting process flow diagram of a method for encoding an image within a two dimensional barcode, according to an aspect or embodiment of the subject disclosure.
Figure 10:
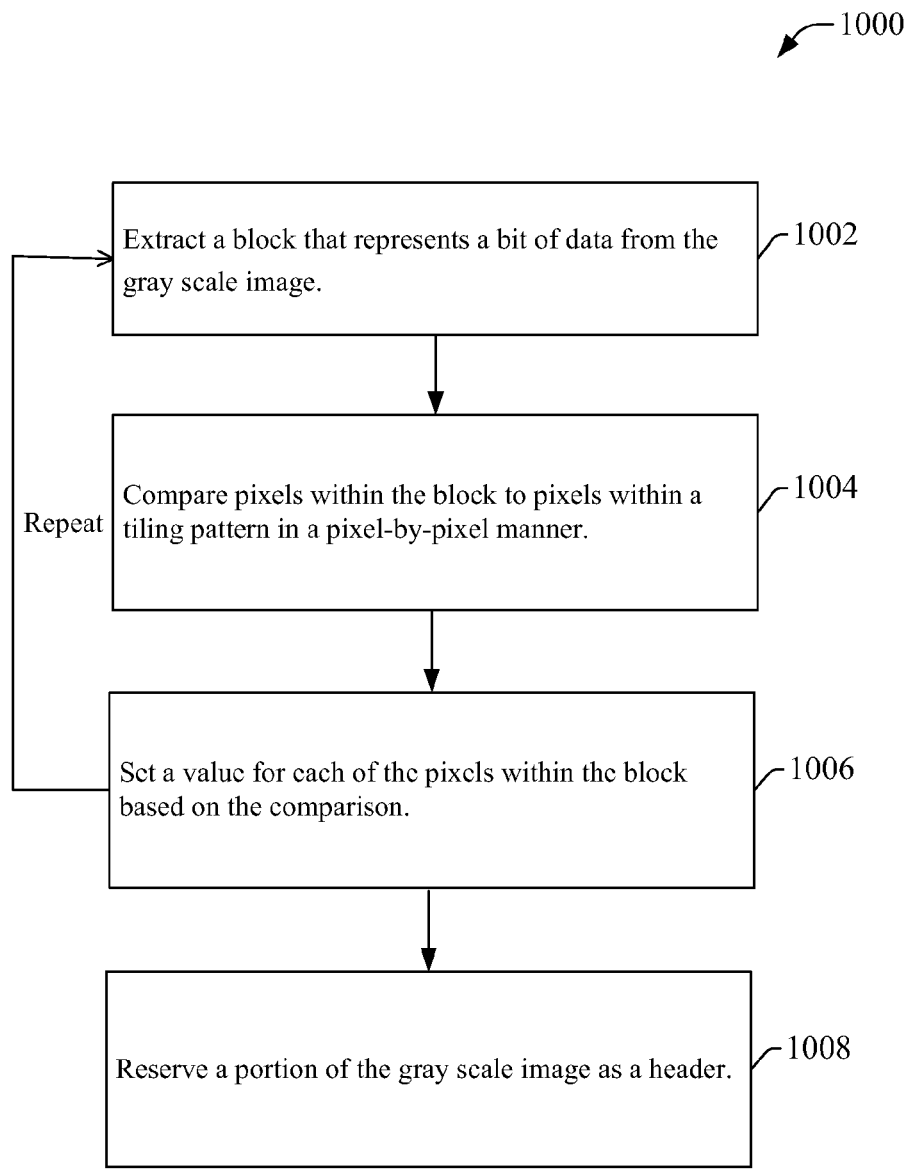
FIG. 10 is an example non-limiting process flow diagram of a method for encoding an image within a two dimensional barcode utilizing at least two tiling patterns, according to an aspect or embodiment of the subject disclosure.
Figure 11:
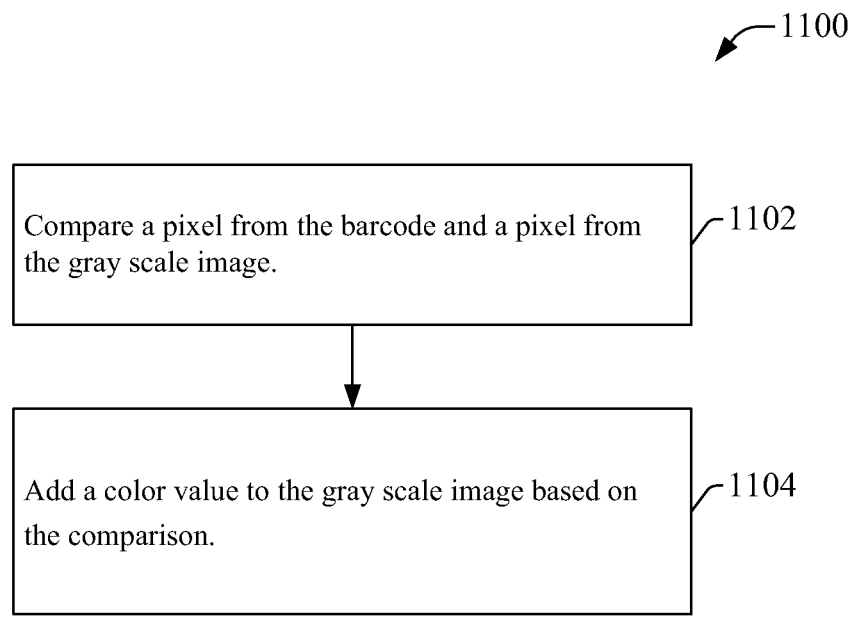
FIG. 11 is an example non-limiting process flow diagram of a method that facilitates colorizing a two dimensional barcode with an embedded image, according to an aspect or embodiment of the subject disclosure.

FIGS. 9-11 illustrate methods 900-1100 that facilitate the design of a two dimensional barcode embedded with an image. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium, a computer readable device, or the like) to facilitate transporting and transferring such methodologies to computers. The term article of manufacture, as used herein, is intended to encompass a computer program accessible from any computer-readable device, carrier, or media, including a non-transitory computer readable storage medium. Any reference to a data store below can refer to a data store stored in a cloud computing environment. Additionally, all or part of the acts and/or steps described below can occur as a service distributed in a cloud computing environment.

FIG. 9 is an example non-limiting process flow diagram of a method 900 for encoding an image within a two dimensional barcode, according to an aspect or embodiment of the subject disclosure. At element 902, a message can be encoded within a two dimensional barcode according to an encoding algorithm. The message is generally any type of text message that can be imputed by a user creating the two dimensional barcode. The text message can be limited to a certain number of characters based on limitations related to the two dimensional barcode. The encoding algorithm can capture the text message, check that the length of the text message is less than a character limit, if the length is less than the character limit, the text message can be converted to a binary data format. The binary text message can be included in a header.

Utilizing a character encoding library, individual characters within the text message can be encoded into a binary data codeword of a certain number of bits (e.g., 8 bits). After the text message is encoded, a header and terminator are placed at the front and at the end of the encoded message. The header can indicate to a decoder the number of characters in the message. The terminator operates to ensure that the decoder will not read anything exceeding the length of the encoded bits.

In an example, the maximum amount of characters allowed within the text message is 34. Translating it in to binary form, the header occupies at most 6 binary bits. The terminator is 4 binary bits used to indicate the end of the encoded message (e.g., "000").

Anticipating that errors will be introduced during transmission of the two dimensional barcode (e.g., by the environment or the channel) that will corrupt data and make decoding the message fail, the encoding algorithm can employ an error correction code to protect the data. The error correction code can be any type of error correction code that can detect errors and correct them. One example of an error correction code is a Reed-Solomon error correction code.

The Reed-Solomon error correction code can detect and correct multiple symbol abnormalities, including erasure and error. Erasure generally refers to erroneous codeword with a known location. Error generally refers to an erroneous codeword with an unknown location. Correcting an erasure requires one error correction symbol, while correcting an error requires two error correction symbols.

Since the two dimensional barcode described herein (e.g., the two dimensional barcode shown at element 106 of FIG. 1) has an image embedded within the two dimensional barcode, noise is introduced when an image of the two dimensional barcode is taken within the detection stages, both erasures and errors can occur. The number of errors and erasures that can be corrected (depending on the number of error correction symbols used) is given by:

$$2t+e \leq n-k,$$

where t is the number of errors, e is the number of erasures, n is the number of total symbols, k is the number of data symbols and (n−k) is the number of error correction symbols. The number of erasures that can be corrected are two times the number of errors that can be corrected.

The maximum length of a Reed Solomon code is:

$$N=2^m-1,$$

where m is the number of bits per symbol. For example, if m=8, the maximum length $N=2^8-1=255$. Since the two dimensional barcode is not able to place all 255 symbols, zeroes can be padded to the two dimensional barcode to make the overall length 255 before error correction encoding.

For example, for an 8 bit Reed-Solomon code, with 120 data symbols, aiming to correct up to 10 errors, and 20 error correction symbols is shorter than 255. Accordingly 115 zeroes can be padded into the data symbols, such that 235 symbols are encoded. After the data is encoded, the padded zeroes are removed and placed after the terminator. When the data is decoded, the removed zeroes are padded in the same way.

At element 904, a gray scale image can be embedded into the two dimensional barcode via a watermarking technique. The watermarking technique can employ two tiling patterns. The gray scale image can be an image with color removed before it is embedded within the barcode. The image can be any type of image, such as a logo, a picture, a cartoon character, or any other type of image.

The image can be of any size that fits within the size of the two-dimensional barcode. If the image is of a size greater than the size of the two-dimensional barcode, the image can be resized down to fit within the two-dimensional barcode. However, according to an embodiment, the size of the image must be greater than 50 pixels×50 pixels. In another embodiment, the size of the image must be greater than 100 pixels×100 pixels. According to a further embodiment, the size of the image must be greater than 115 pixels×115 pixels.

The image can be of a size that can fill at least 50% of the two dimensional barcode. In another embodiment, the image can be of a size that can fill at least 70% of the two dimensional barcode. In a further embodiment, the image can be of a size that can fill at least 85% of the two dimensional barcode.

If the image has a complication shape or a shape with many edges, the image may hamper the eventual decoding process of the message within the two dimensional barcode. In this case, the resolution of the image can be decreased to facilitate success in the eventual decoding process. The image can be of any format, including "bmp," "gif," "jpeg," "tiff," or any other format. However, in an embodiment, the "bmp" format is preferred.

Tiling patterns are generally any pre-defined pattern that can be used to represent data "0" and data "1" in the calibration of the image. Examples of tiling patterns 302 (representing data "0"), 304 (representing data "1") are shown in FIG. 3. Using tiling patterns in the embedding process calibrates the gray level of the image without allowing the gray level to be changed by the camera with different threshold values. Using tiling patterns, a decoder can determine whether the data is "0" or "1" by comparing the image to the tiling patterns without using a threshold. Accordingly, reliability is increased and less processing work is required. The tiling patterns are not limited to the patterns 302 and 304. The tiling patterns can be any patterns of pseudorandomly positioned sub-blocks. Additionally, although two tiling patterns are shown and described, it will be understood that more than two tiling patterns can be utilized.

In an embodiment, to embed an image within the two dimensional barcode, the watermark component can re-size the image so that it is of a size 116 pixels×116 pixels. The watermark component can make the image into a gray scale image by removing color from the image. The watermark component can embed the gray scale image into the two dimensional barcode as follows. The gray scale image (size 116 pixels×116 pixels) can be split into blocks representing a single bit of data. The size of the block can be 4 pixels×4 pixels with either the tiling pattern representing data "0" (e.g., 302) or the tiling pattern representing data "1" (e.g., 304). The total number of available blocks is 841. The last 6 blocks are reserved for 6 bits of header redundancy.

At element 906, a finder pattern and a quiet zone can be added to the two dimensional barcode with the embedded image. The finder pattern (an example is shown in element 216 of FIG. 2) is a box or frame around the two dimensional barcode of a solid line and a dashed (broken line). The broken line can act as a timing pattern that is used to locate the coordinates of the blocks in the barcode and to estimate the physical size of the barcode. However, the finder pattern can be any pattern that can facilitate location of the barcode and measuring of the size of the barcode during the detection of the barcode. The barcode can also be utilized to minimize the incorrect detection of the barcode (or fault detection). An example of the finder pattern of element 216 of FIG. 2 is different from a traditional Data Matrix finder pattern, adding an extra box (element 218 of FIG. 2) in the broken line in the top right hand corner of the finder pattern. The corrected top right corner reduces the risk of an improper transformation when the barcode image is skewed. The Data Matrix code standard requires the number of blocks (or modules) on the vertical and horizontal axis to be even. In the finder pattern described herein, the number of blocks (or modules) on the vertical and horizontal axis are odd. Accordingly, the top right corner becomes a black module (extra block element 218 of FIG. 2) instead of a white module.

The quiet zone is the surrounding white space around the finder pattern. The finder pattern can help in the detection and transformation of the two dimensional barcode to the correct position before decoding the message. The quiet zone can isolate the barcode from the outside environment to avoid distraction during barcode detection. For example, the border width of the finder pattern can be 4 pixels and the width of the quiet zone can be 8 pixels.

FIG. 10 is an example non-limiting process flow diagram of a method 1000 for encoding an image within a two dimensional barcode utilizing two tiling patterns, according to an aspect or embodiment of the subject disclosure. At element 1002, a block is extracted that represents a bit of data from the gray scale image. At element 1004, the pixels within the block are compared to pixels within a tiling pattern in a pixel by pixel manner. At element 1006, a value for each of the pixels within the block can be set based on the comparison. The acts illustrated from elements 1002-1006 can be repeated as long as blocks remain. At element 1108, a portion of the gray scale image can be reserved as a header.

Elements 1004 and 1006 employ four major rules in a pixel by pixel comparison of each block to determine a value of the corresponding pixel in the final two dimensional barcode with the embedded image. If the bit of the encoded data is 0, compare extracted block with tiling pattern 302. If the bit of the encoded data is 1, compare extracted block with tiling pattern 304 according to the following rules:

Rule 1: Pixel of both blocks is high intensity (e.g., 255), the pixel of the same position of the final barcode is high intensity (e.g., 255).

Rule 2: Pixel of extracted block is high intensity (e.g., 255), pixel of tiling pattern is low intensity (e.g., 0), the pixel in the same position of the final barcode is second high intensity (e.g., 170).

Rule 3: Pixel of extracted block is low intensity (e.g., 0), pixel of tiling pattern is high intensity (e.g., 255), the pixel in the same position of the final barcode is second low intensity (e.g., 85).

Rule 4: Pixel of both blocks is low intensity (e.g., 0), the pixel in the same position of the final barcode is low intensity (e.g., 0).

The comparison is repeated until all blocks of the image are embedded within the barcode. If any remaining blocks, the process will restart from the first bit of the data. The last (e.g., 6) reserved blocks at element 1008 are embedded with the corresponding number of bits (e.g., 6 bits) of header for redundancy.

FIG. 11 is an example non-limiting process flow diagram of a method that facilitates colorizing a two dimensional barcode with an embedded image, according to an aspect or embodiment of the subject disclosure. At element 1102, a pixel from the barcode is compared to a pixel from the gray scale image. The comparison of element 1102 is a pixel by pixel comparison according to the following rules:

Rule 5: If both pixels are low intensity (e.g., 0), then set the pixel of the color barcode to be low intensity (e.g., 0).

Rule 6: If pixel from the gray scale image is low intensity (e.g., 0) and the extracted pixel of the barcode is not zero, set the pixel of the color barcode to be a secondary low intensity (e.g., 92).

Rule 7: Otherwise drive a multiple between the two pixels and calculate the pixel of the final barcode by dividing the multiple.

Multiple=pixel from gray scale image/pixel from gray scale two dimensional barcode (This formula is just an example formula for calculation of the Multiple. Other formulas may be used to calculate the Multiple.)

Pixel of Final Barcode=Pixel from color image/Multiple

At element 1104, a color value is added to the gray scale image based on the comparison. For example, a color value can be added based on the calculation of the pixel of the final barcode. The color value can be added using the relationship between gray scale and RGB scale.

Gray level=0.2989*R+0.5870*G+0.1140*B

By adjusting the ratios of red (R), green (G) and blue (B), color can be added to the two dimensional barcode with the embedded image without changing the gray level of the two dimensional barcode.

Detection

Figure 23:
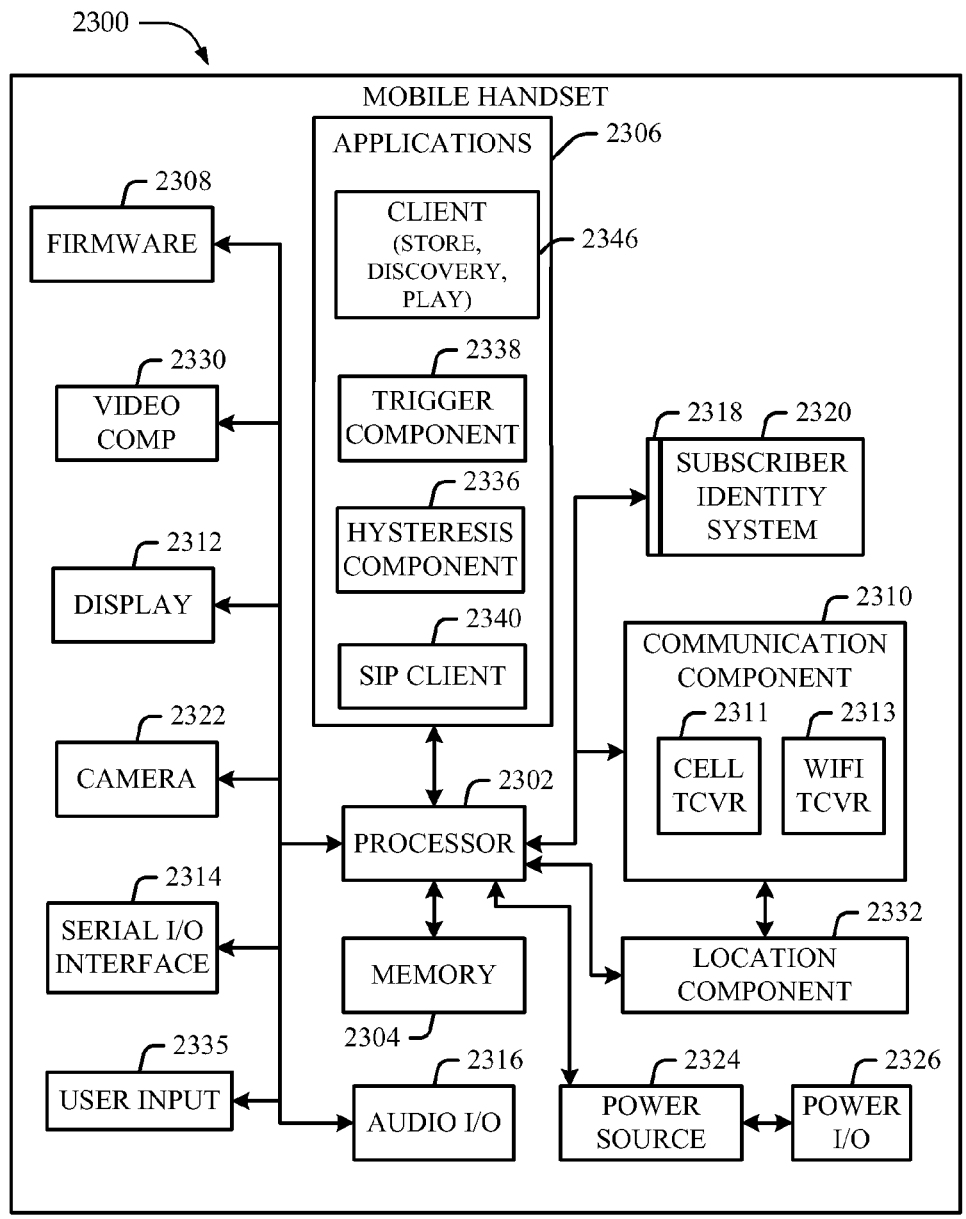
FIG. 23 is an example non-limiting a schematic diagram of an example mobile device that can facilitate implementation of the aspects and embodiments described herein.

The systems and methods that facilitate the detection can generally be implemented by a mobile computing device (e.g., a tablet computing device or a smart phone as shown in FIG. 23). The systems and methods can employ one or more applications (e.g., mobile apps) programmed to receive an image taken by a camera of the mobile computing device to facilitate the detection.

Figure 12:
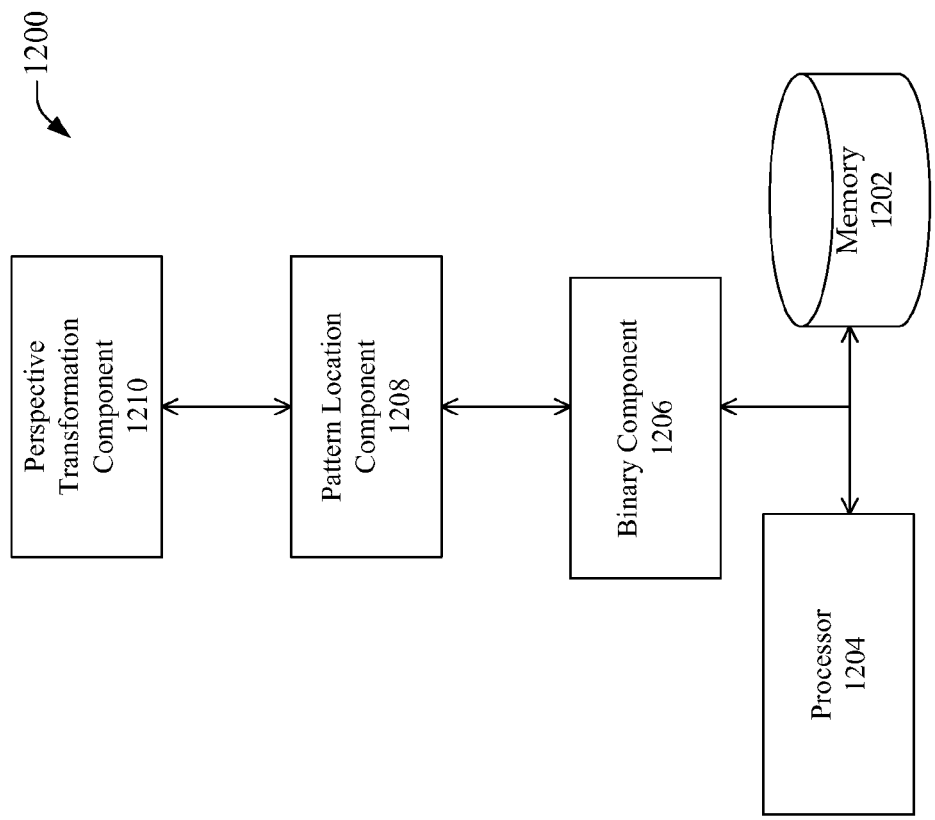
FIG. 12 is an example non-limiting schematic diagram of a system that facilitates detection of a two dimensional barcode with an embedded image, according to an aspect or embodiment of the subject disclosure.

FIG. 12 is an example non-limiting schematic diagram of a system 1200 that facilitates detection of a two dimensional barcode with an embedded image, according to an aspect or embodiment of the subject disclosure. System 1200 includes a memory 1202 that can store instructions, components, or the like. System 1200 also includes a processor 1204 that can facilitate execution of the instructions, components, or the like to facilitate the performance of various operations associated with the instructions, components, or the like. The memory 1202 and processor 1204 can be the memory and processor of a single computing device or distributed throughout a network of computing devices across a network.

System 1200 includes various components that can facilitate detection of a two dimensional barcode. Detection generally refers to the procedure of acquiring a two dimensional barcode embedded with an image in a practical environment. Upon recording an image, system 1200 can generate a binary image based on the image of a two dimensional barcode embedded with visual information. System 1200 can locate a finder pattern within the binary image and perform a perspective transformation of the binary image in two dimensions based on the finder pattern, For example, system 1200 can include a binary component 1206, a pattern location component 1208 and a perspective transformation component 1210 that are each stored in the memory 1202 and the processor 1204 executes or facilitates the execution of the components 1206, 1208 and 1210. The binary component 1206 can generate the binary signal based on the image (recorded by a camera on a mobile computing device). The pattern location component 1208 can locate the finder pattern within the binary image. The finder pattern is a crucial element of the two dimensional barcode with the embedded image since it can aid in the location of the two dimensional barcode and can facilitate determination of the size of the two dimensional barcode. The perspective transformation component 1210 can facilitate performance of the perspective transformation of the binary image in two dimensions based on the finder pattern.

Figure 13:
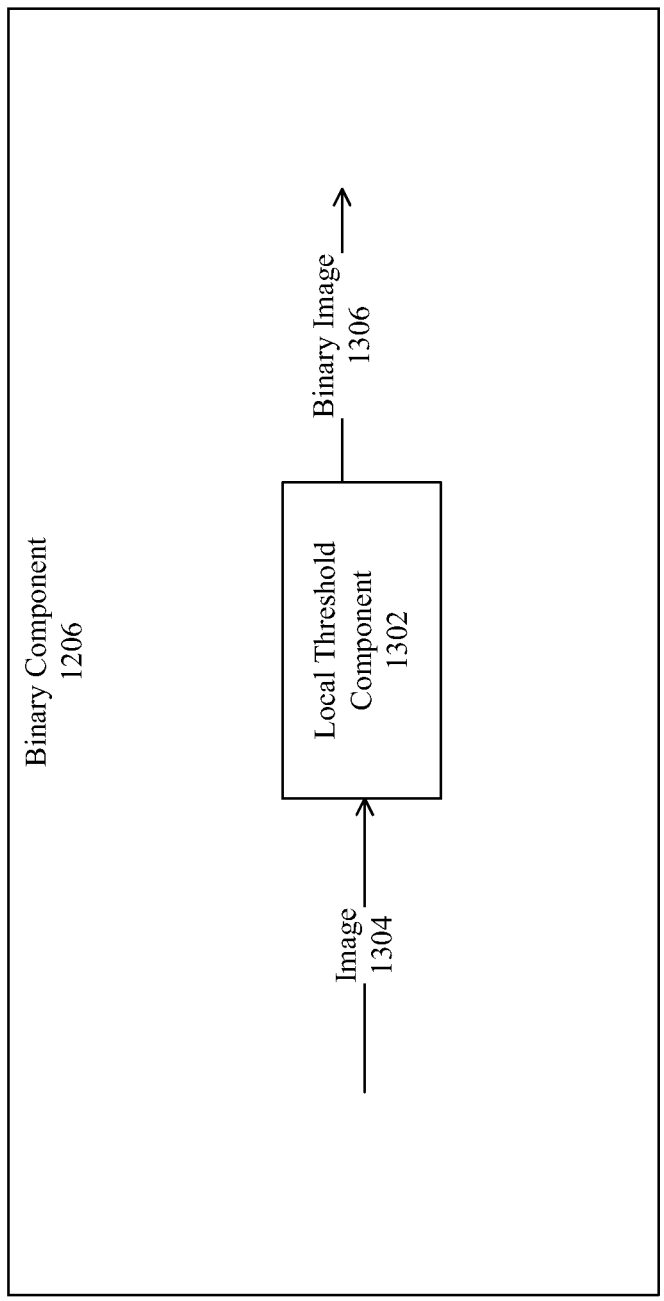
FIG. 13 is an example non-limiting schematic diagram of the binary component that facilitates converting an image into a binary image, according to an aspect or embodiment of the subject disclosure.

The binary image generated by the binary component 1206 can be a gray scale binary image. Accordingly, the binary component 1206 first converts the image (e.g., taken by a camera associated with the mobile computing device) to grayscale. A binary image can be generated by a local thresholding algorithm. As shown in FIG. 13, the binary component 1206 can include a local threshold component 1302 that can convert the image 1304 to the binary image 1306.

In an embodiment, the image can be 400 pixels×400 pixels. The local threshold component 1302 can divide the image into blocks of 8 pixels×8 pixels. The contrast of the block can be determined. If the contrast is less than 24, the average value of the block is set to the sum of the pixels/64. If the contrast is greater than or equal to 24, the average value of the block is set to the minimum pixel of the block/2. Accordingly, when the contrast of the block is lower than a certain value (24 in this case), the block is either a fully black area or a fully white area.

An average value of a grid is calculated. The grid is 5 blocks×5 blocks, or 40 pixels×40 pixels. The minimum value of the grid can be examined to eliminate excess speckling (e.g., caused by LCD interference of a computer monitor). If the minimum value of the grid is greater than or equal to 70, the threshold of the grid is 0. If the minimum value of the grid is less than 70, the threshold of the grid is replaced by a calculated threshold, or reduced by multiplying the threshold by ⅔. The calculated threshold of the grid is lowered, further removing the noise near the finder pattern. The finder pattern often has a low gray scale value. Accordingly, this calculation that removes the excess noise still preserves the finder pattern within the gray scale image.

After the binary image is generated by the binary component 1206, the pattern location component 1208 can locate the finder pattern within the binary image. The pattern location component 1208 can require the black pixels spread averagely within the finder pattern. The detection is performed multiple times per frame (e.g., five times per frame) and each time the detection frame size is increased to attempt to locate the finder pattern.

Figure 14:
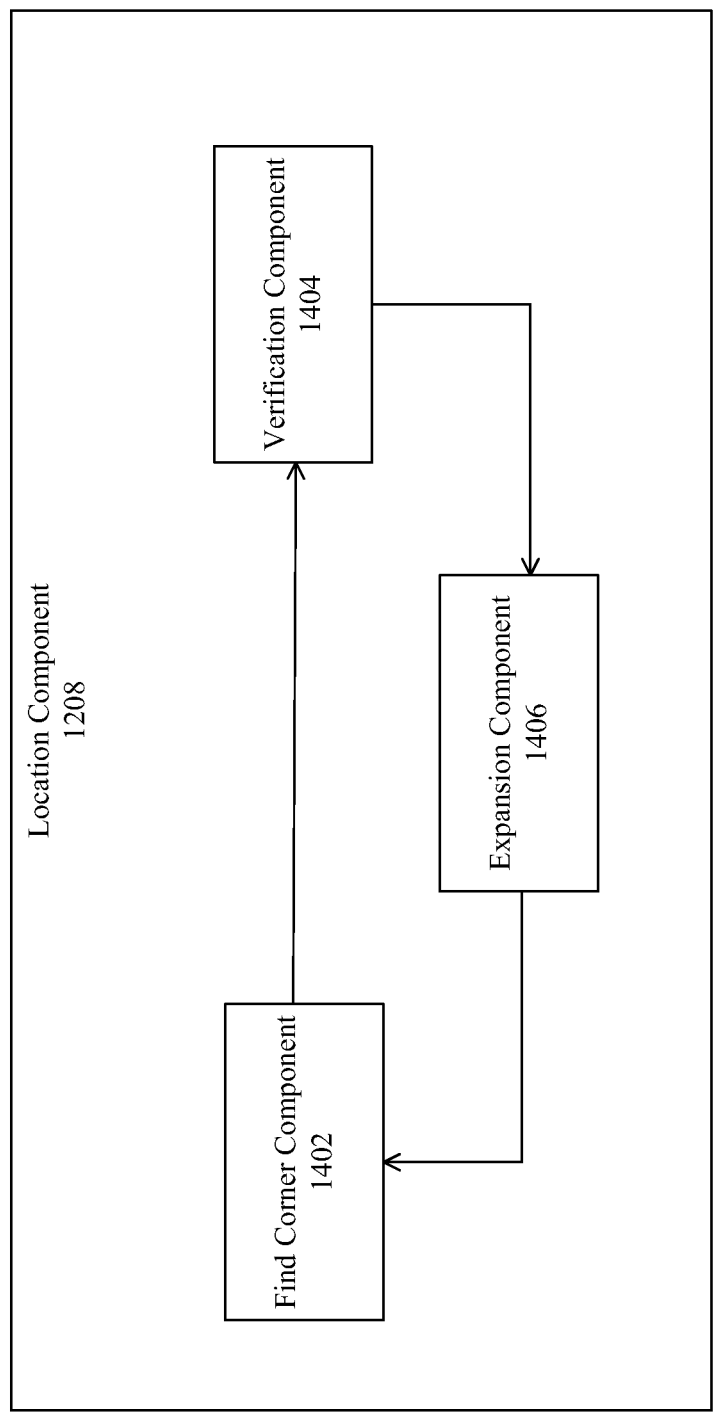
FIG. 14 is an example non-limiting schematic diagram of the location component that facilitates location of the finder pattern within the binary image, according to an aspect or embodiment of the subject disclosure.

An example of the location component 1208 is shown in FIG. 14. The location component 1208 can include a find corner component 1402 a verification component 1404 and an expansion component 1406.

The find corner component 1402 can locate the four corners of a prospective finder pattern. The four corners can be, for example, the first block at the X axis (first block at the left side of the vertical solid border), the last block at the X axis (left side of the vertical broken border), the first block at the Y axis (under the horizontal broken border) and the last block at the Y axis (above the horizontal solid border).

The number of transitions in the X coordinates and the Y coordinates can be expressed as $T_x$ and $T_y$. $T_x$ and $T_y$ represent the number of blocks that can be extracted from each row and each column, respectively. In an example, $T_x=T_y=29$.

The block width detection can use the horizontal broken border (e.g., starting at x=3, y=3). A 1 pixel×1 pixel sliding window is defined that can move a pixel each time in the X-coordinates. If there is a gray-level changing from high intensity (e.g., 255) to low intensity (e.g., 0) or low intensity (e.g., 0) to high intensity (e.g., 255), the stop position is recorded for the current block and the start position for the next block is recorded. The detection with continue until reaching the final X-coordinate. After detection, a bin of X-blocks (blocks in the X direction) can determine or collect the start and stop coordinates of each column. The number of columns stored in the X-blocks bin can be examined. If there are not $T_x$ columns, there is a fault detected. Then the start point of the detection can be moved to the next line (such as x=4, y=3) and the block width detection can start again until it finds the correct value of columns ($T_x$).

The height of each row can be accomplished in the same manner as the detection in the X-axis. A difference is that the vertical broken border is used as the examination target. After the detection, the obtained result is recorded in the Y-blocks bin. Sometimes the correct data cannot be obtained due to an improper transformation. In that case, the decoding can be regarded as a failure.

The verification component 1404 can verify the four corners of the prospective finder pattern based on one or more constraint. In an example, the verification can be conducted based on two constraints. The first constraint ensures that the solid (L-shaped) borders exist in the finder pattern. As such, the prospective finder pattern has at least two transitions between black and white modules are less than or equal to 1. The second condition relates to the broken borders, in which the length deviations of all of the borders are small. For example, the under the second condition, deviation of the lengths of all borders must be less than or equal to 9/10.

The verification component 1404 can ensure that a fault has not been detected based on the locating of the four corners of the prospective finder pattern. The expansion component can expand the search area to facilitate the location upon a failure of the verification. If the corners pass the verification, the corners can be matched to the proper vertices. Initially, an initial size of the detection frame can be set to a value (e.g., 80 pixels×80 pixels). The expansion component 1406 can increase the size of the detection frame (e.g., by 15 pixels×15 pixels) with each expansion of the search area.

After the coordinates of the four vertices of the finder pattern are detected, perspective transformation in two dimensions can be performed to synchronize the captured data with the decoder. The perspective transformation component 1210 can facilitate the performance of the perspective transformation of the binary image in two dimensions based on the finder pattern. After the transformation, the axial nonuniformity and the grid nonuniformity of the binary image can be reduced.

After the detection of the image with the finder pattern and the transformation, since errors will be introduced during the transmission by the environment or the channel taking the image, corrupting the data and causing the detector to fail to decode, an error and erasure correction algorithm can be applied to the two dimensional barcode embedded with the visual information. The error and erasure correction algorithm can be any algorithm that can able to detect errors and correct the errors. The error and erasure correction algorithm can also detect and correct erasures. In an embodiment, the error and erasure correction algorithm can mark a portion of the two dimensional barcode embedded with the visual information near an edge of the visual information as an erasure. For example, the error and detection algorithm can be based on the Reed-Solomon error and erasure correction code. The error and erasure correction code can be utilized to overcome the noise brought on by the image embedded in the two dimensional barcode.

The number of errors and erasures that can be corrected are given in the formula:

$$2t+e \leq n-k,$$

where t is the number of errors, e is the number of erasures, n is the number of total symbols, k is the number of data symbols and (n−k) is the number of error correction symbols. The number of erasures that can be corrected are two times the number of errors that can be corrected.

The maximum length of a Reed Solomon code is:

$$N=2^m-1,$$

where m is the number of bits per symbol. For example, if m=8, the maximum length $N=2^8-1=255$. Since the two dimensional barcode is not able to place all 255 symbols, zeroes can be padded to the two dimensional barcode to make the overall length 255 before error correction encoding.

For example, for an 8 bit Reed-Solomon code, with 120 data symbols, aiming to correct up to 10 errors, and 20 error correction symbols is shorter than 255. Accordingly 115 zeroes can be padded into the data symbols, such that 235 symbols are encoded. After the data is encoded, the padded zeroes are removed and placed after the terminator. When the data is decoded, the removed zeroes are padded in the same way.

To further reduce the errors and erasures due to the image, the portion of the data encoded within the two dimensional barcode can correspond to at most half of the area of the visual information.

Figure 15:
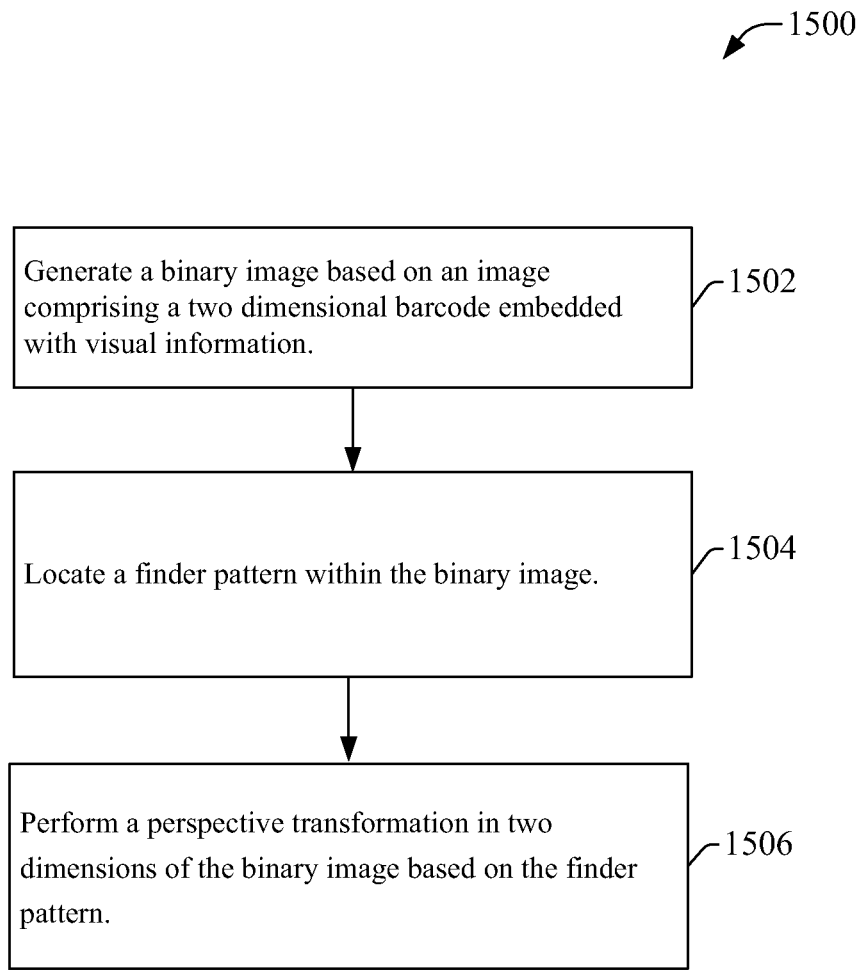
FIG. 15 is an example non-limiting process flow diagram of a method for detecting a two dimensional barcode with an embedded image, according to an aspect or embodiment of the subject disclosure.
Figure 16:
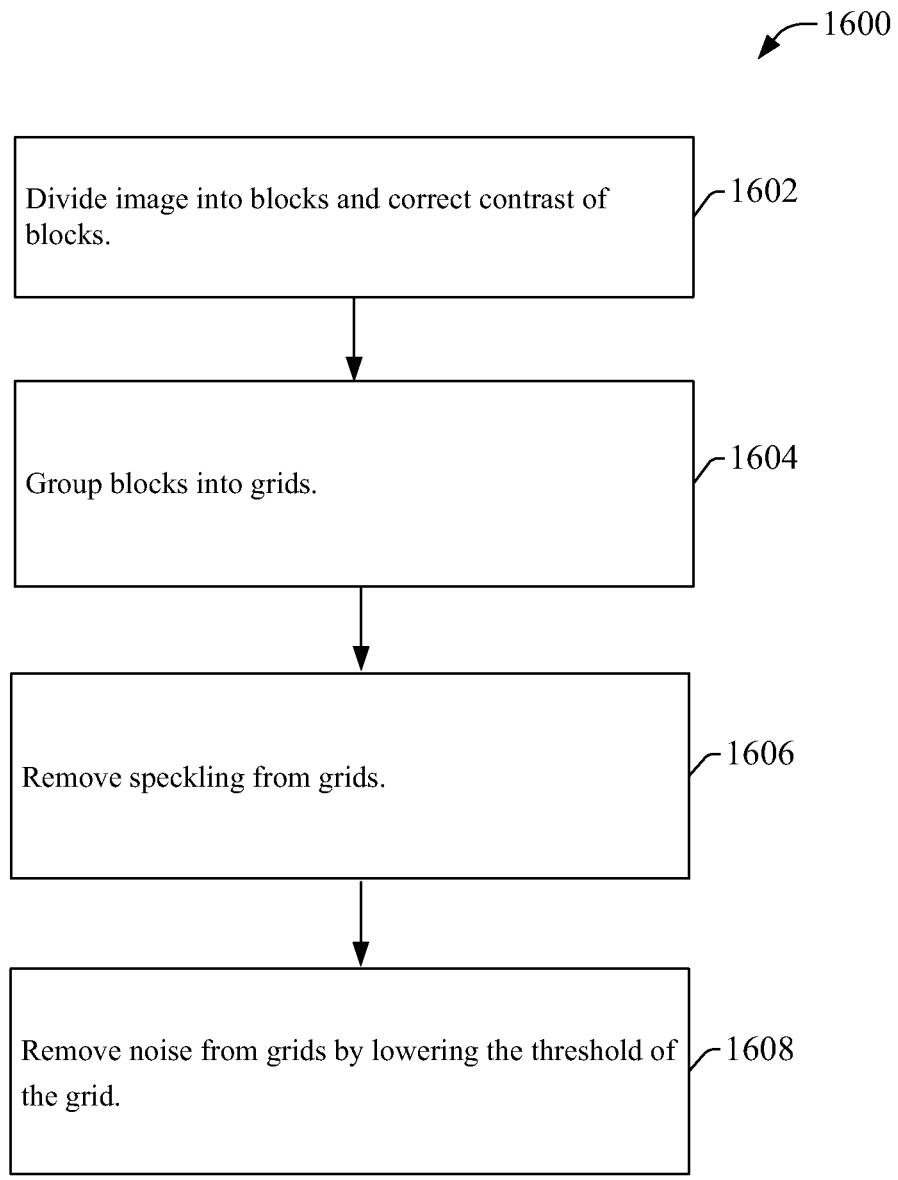
FIG. 16 is an example non-limiting process flow diagram of a method that reduces noise and spackling within the image to facilitate detection of the two dimensional barcode within the image, according to an aspect or embodiment of the subject disclosure.
Figure 17:
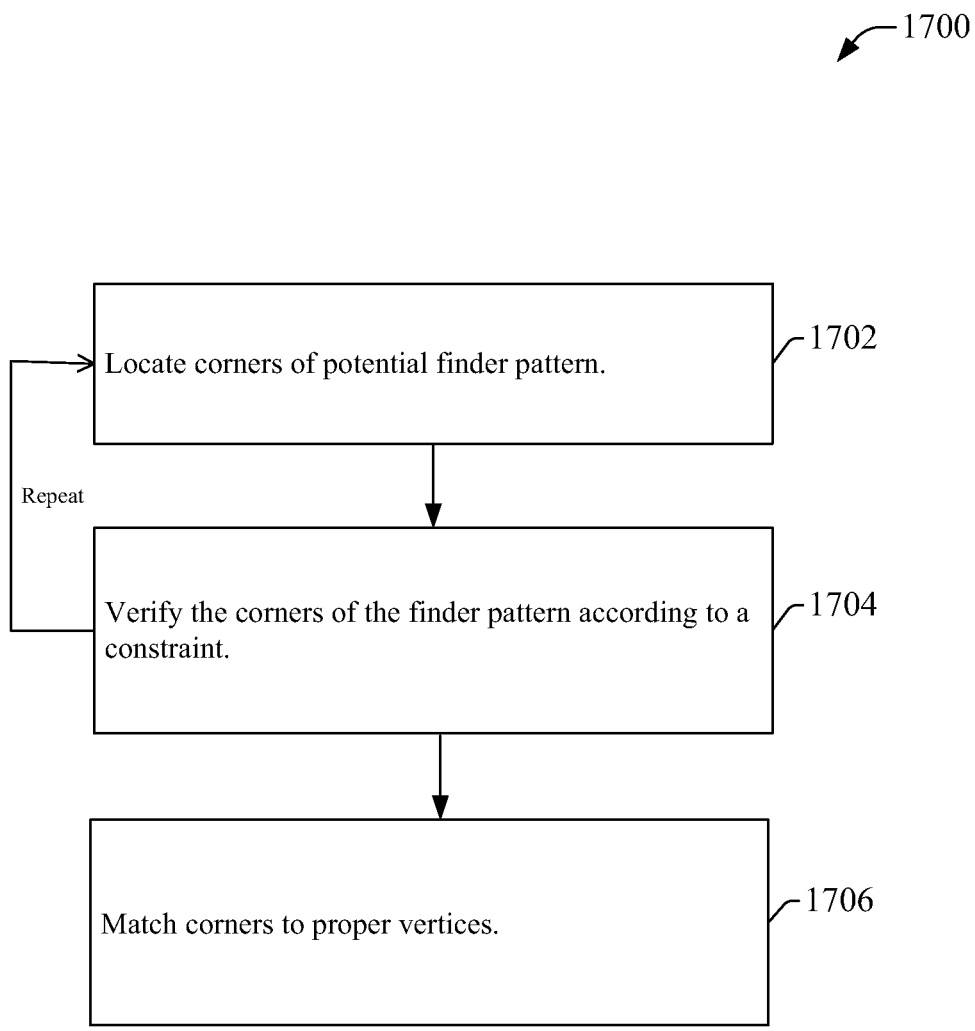
FIG. 17 is an example non-limiting process flow diagram of a method for locating the finder pattern within the image, according to an aspect or embodiment of the subject disclosure.

FIGS. 15-17 illustrate methods 1500-1700 that facilitate the detection of a two dimensional barcode embedded with an image. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium, a computer readable device, or the like) to facilitate transporting and transferring such methodologies to computers. The term article of manufacture, as used herein, is intended to encompass a computer program accessible from any computer-readable device, carrier, or media, including a non-transitory computer readable storage medium. Any reference to a data store below can refer to a data store stored in a cloud computing environment. Additionally, all or part of the acts and/or steps described below can occur as a service distributed in a cloud computing environment.

FIG. 15 is an example non-limiting process flow diagram of a method 1500 for detecting a two dimensional barcode with an embedded image, according to an aspect or embodiment of the subject disclosure. At element 1502 a binary image is generated based on an image (e.g., recorded by a camera) of the two dimensional barcode embedded with visual information. The binary image should be a gray scale image. Accordingly, if the image is a color image, the image must be gray scaled before conversion to the binary image. The binary image can be generated based on a local thresholding algorithm.

At element 1504, a finder pattern is located within the binary image. The location of the finder pattern can include coordinates of the four corners of the finder pattern. At element 1506, a perspective transformation is performed in two dimensions of the binary image based on the finder pattern. The perspective transformation in two dimensions can be performed to synchronize the captured data with the decoder. After the transformation, the axial nonuniformity and the grid nonuniformity of the binary image can be reduced.

FIG. 16 is an example non-limiting process flow diagram of a method 1600 that reduces noise and spackling within the image to facilitate detection of the two dimensional barcode within the image, according to an aspect or embodiment of the subject disclosure. At element 1602 the image can be divided into blocks and the contrast of the blocks can be corrected. For example, if the contrast is less than 24, the average value of the block is set to the sum of the pixels/64. If the contrast is greater than or equal to 24, the average value of the block is set to the minimum pixel of the block/2. Accordingly, when the contrast of the block is lower than a certain value (24 in this case), the block is either a fully black area or a fully white area.

At element 1604, the blocks are grouped into grids (e.g., 5 blocks×5 blocks). At element 1606, speckling is removed from the grids. The minimum value of the grid can be examined to eliminate excess speckling. The threshold of the grid is lowered, further removing the noise near the finder pattern. At element 1608, noise is removed from the grid through lowering the threshold of the grid. The finder pattern often has a low gray scale value. Accordingly, this calculation that removes the excess noise still preserves the finder pattern within the gray scale image.

FIG. 17 is an example non-limiting process flow diagram of a method 1700 for locating the finder pattern within the image, according to an aspect or embodiment of the subject disclosure. At element 1702, corners of a potential finder pattern are located. The four corners can be, for example, the first block at the X axis (first block at the left side of the vertical solid border), the last block at the X axis (left side of the vertical broken border), the first block at the Y axis (under the horizontal broken border) and the last block at the Y axis (above the horizontal solid border).

At element 1704, the corners are verified according to a constraint. In an example, the verification can be conducted based on two constraints. The first constraint ensures that the solid (L-shaped) borders exist in the finder pattern. As such, the prospective finder patter has at least two transitions between black and white modules are less than or equal to 1. The second condition relates to the broken borders, in which the length deviations of all of the borders are small. For example, the under the second condition, deviation of the lengths of al borders to each other must be less than or equal to $9/10$.

The verification can ensure that a fault has not been detected based on the locating of the four corners of the prospective finder pattern. The location act at element 1702 and verification act at element 1704 can be repeated until the corners pass the verification. For each repeat, the detection frame size can be increased in an attempt to locate the finder pattern. At element 1706, the locations of the corners are matched to the proper vertices (if the corners pass the verification).

Decoding

The systems and methods that facilitate the decoding (or demodulation) can generally be implemented by a mobile computing device (e.g., a tablet computing device or a smart phone as shown in FIG. 23). The systems and methods can employ one or more applications (e.g., mobile apps) programmed to receive an image detected and pre-processed (according to a detection algorithm described above) by the mobile computing device to facilitate the decoding.

Figure 18:
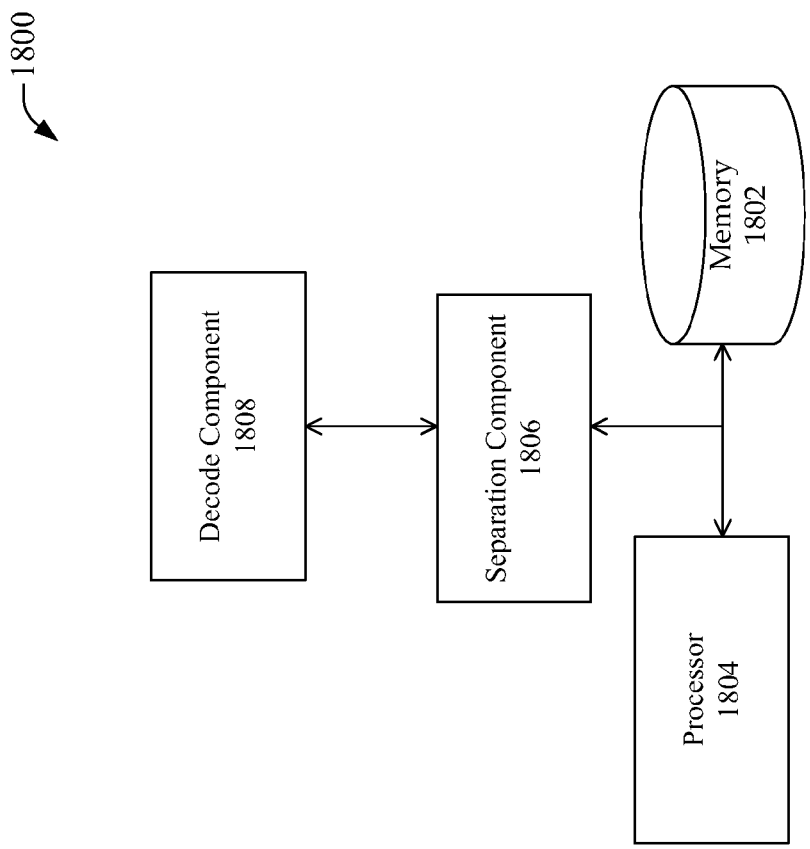
FIG. 18 is an example non-limiting schematic diagram of a system that facilitates decoding a message encoded within the two dimensional barcode, according to an aspect or embodiment of the subject disclosure.

FIG. 18 is an example non-limiting schematic diagram of a system 1800 that facilitates decoding a message encoded within the two dimensional barcode, according to an aspect or embodiment of the subject disclosure. System 1800 includes a memory 1802 that can store instructions, components, or the like. System 1800 also includes a processor 1804 that can facilitate execution of the instructions, components, or the like to facilitate the performance of various operations associated with the instructions, components, or the like. The memory 1802 and processor 1804 can be the memory and processor of a single computing device or distributed throughout a network of computing devices across a network.

System 1800 includes various components that can facilitate decoding information that is encoded within a two dimensional barcode. System 1800 can separate a bit stream of a watermark from a two dimensional barcode. After the separation, system 1800 can facilitate decoding of content represented by the two dimensional barcode according to a Reed-Solomon detection algorithm.

For example, system 1800 can include a separation component 1806 and a decode component 1808 that are each stored in the memory 1802 and the processor 1804 executes or facilitates the execution of the components 1806 and 1808. The separation component 1806 can separate a bit stream of a watermark from a two dimensional barcode. After the separation, the decode component 1808 can facilitate decoding of content represented by the two dimensional barcode according to a detection algorithm (e.g., a Reed-Solomon detection algorithm).

Before the separation component 1806 can separate the bit stream of the watermark from the two dimensional barcode, the image (e.g., recorded by a camera of a mobile device) must be transformed into a bit stream. In the case where the two dimensional barcode embedded with the watermark is transformed into a gray scale image, the bit stream of the watermark can be separated from the two dimensional barcode within the gray scale image. In the case where the two dimensional barcode is transformed to a binary image, block coordinates are acquired from the binary image and the bit stream corresponding to the watermark can be separated from the two dimensional barcode utilizing the block coordinates.

The block coordinates are examined in the X direction and the Y direction along the X and Y axes to extract a block each time from the captured image. Because of a variety of distances between various cameras and the barcode when an image of the barcode is acquired, captured images of different sizes can be generated. Therefore, a standard block size is produced before extraction of the bit stream. Therefore, the block size is resized to a standard block size (e.g., 8 pixels×8 pixels). Each extracted block can be divided into two areas, for example, "border area" and "center area." For example, the border area is an outer part (e.g., 20 pixels) that is close to the edge of the resized block. The center area is an area located in a center part (e.g., 2 pixels by 2 pixels) of the resized block.

The minimum and maximum gray level values inside the border area can be determined. The minimum and maximum gray level values can be used to determine whether the block is located at the edge of the image or located other than at the edge of the image. For example, the block can be located at the edge of the image if the difference between the maximum gray level and the minimum gray level is greater than the second low intensity (e.g., 85). However, if the difference between the maximum gray level and the minimum gray level is greater than the second low intensity (e.g., 85), the block can be located not on the edge of the image.

When the block is at the edge of the image, the center point in the border area histogram is determined. For example the center point can be calculated according to:

Center Point=minimum gray level−[(minimum gray level−maximum gray level)/2].

The high concentration pixel between the center point of the histogram is used to average out the pixels. The average value between these pixels and the center area can be used to extract the binary data. If the average value of the border area is greater than the average value of the center area, the extractive binary data is "1." If the average value of the border area is less than the average value of the center area, the extractive binary data is "0."

The above-described comparison is not the only way to accomplish the comparison. Any number of comparison methods can be used. For example, one can use the median value to compare.

When the block is not at the edge of the image, the average values between the border area and the center area can be compared. If the average value of the border area is greater than the average value of the center area, the extractive binary data is "1." If the average value of the border area is less than the average value of the center area, the extractive binary data is "0."

Figure 19:
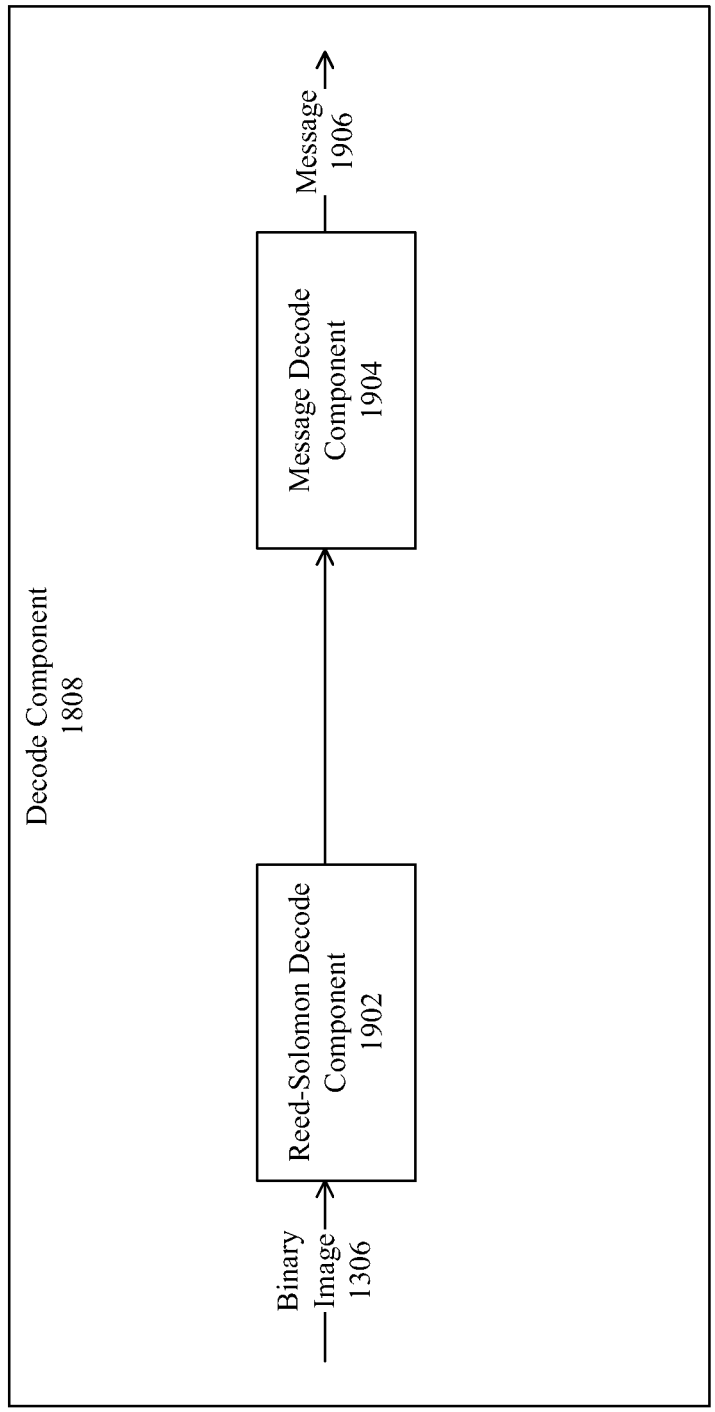
FIG. 19 is an example non-limiting schematic diagram of the decode component that can facilitate decoding a message from within the two dimensional barcode, according to an aspect or embodiment of the subject disclosure.

Upon separation of the watermark and the two dimensional barcode, the decode component 1808 can decode the message within the two dimensional barcode. The decode component 1808 is shown in more detail in FIG. 19. The decode component 1808 includes Reed-Solomon decode component 1902 and a message decide component 1904. The Reed-Solomon decode component 1902 can receive the binary image 1306 and conduct an error and erasure correction (or error and erasure correction decoding). The use of error and erasure correction decoding improves the accuracy of barcode detection compared to the use of conventional error only decoding.

Since errors will be introduced during the transmission by the environment or the channel taking the image, corrupting the data and causing the detector to fail to decode, an error and erasure correction algorithm can be applied to the two dimensional barcode embedded with the visual information. The error and erasure correction algorithm can be any algorithm that can able to detect errors and correct the errors. The error and erasure correction algorithm can also detect and correct erasures. In an embodiment, the error and erasure correction algorithm can mark a portion of the two dimensional barcode embedded with the visual information near an edge of the visual information as an erasure. For example, the error and detection algorithm can be based on the Reed-Solomon error and erasure correction code. The error and erasure correction code can be utilized to overcome the noise brought on by the image embedded in the two dimensional barcode.

The number of errors and erasures that can be corrected are given in the formula:

$$2t+e \le n-k,$$

where t is the number of errors, e is the number of erasures, n is the number of total symbols, k is the number of data symbols and (n−k) is the number of error correction symbols. The number of erasures that can be corrected are two times the number of errors that can be corrected.

The maximum length of a Reed Solomon code is:

$$N=2^m-1,$$

where m is the number of bits per symbol. For example, if m=8, the maximum length $N=2^8-1=255$. Since the two dimensional barcode is not able to place all 255 symbols, zeroes can be padded to the two dimensional barcode to make the overall length 255 before error correction encoding.

For example, for an 8 bit Reed-Solomon code, with 120 data symbols, aiming to correct up to 10 errors, and 20 error correction symbols is shorter than 255. Accordingly 115 zeroes can be padded into the data symbols, such that 235 symbols are encoded. After the data is encoded, the padded zeroes are removed and placed after the terminator. When the data is decoded, the removed zeroes are padded in the same way.

After the correction, the message 1906 can be decoded by the message decode component 1904. The message can be displayed after it is decoded by the message decode component 1904. For example, the message can be displayed on the screen of the mobile computing device that decoded the message.

Figure 20:
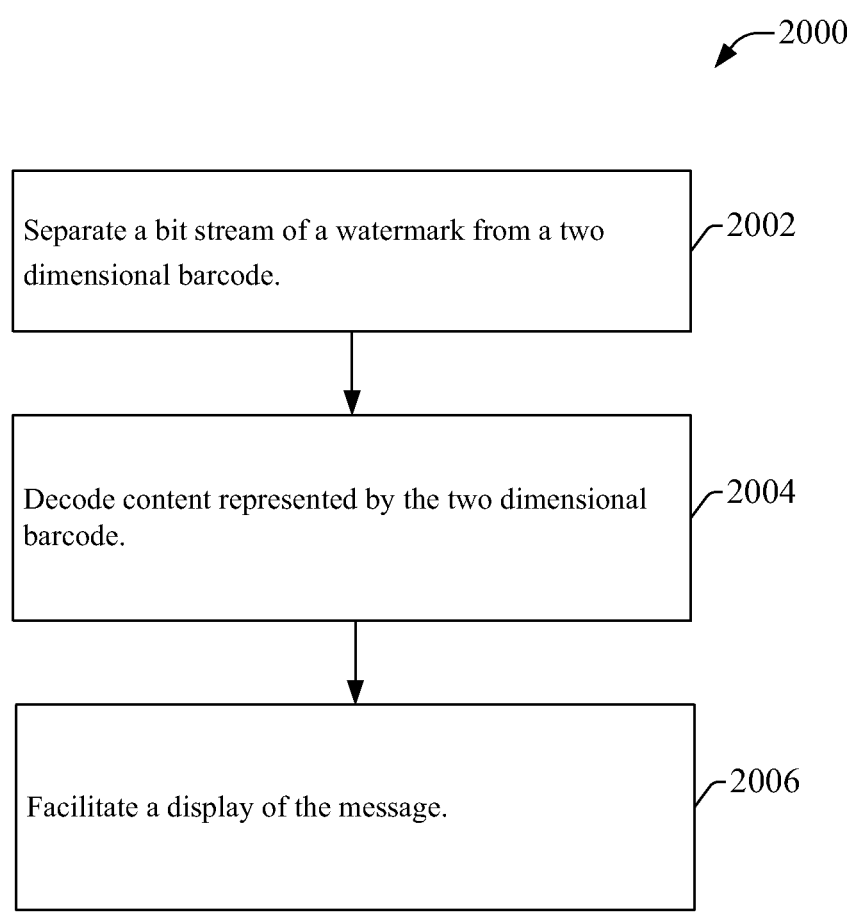
FIG. 20 is an example non-limiting process flow diagram of a method that facilitates decoding a message encoded within the two dimensional barcode, according to an aspect or embodiment of the subject disclosure.
Figure 21:
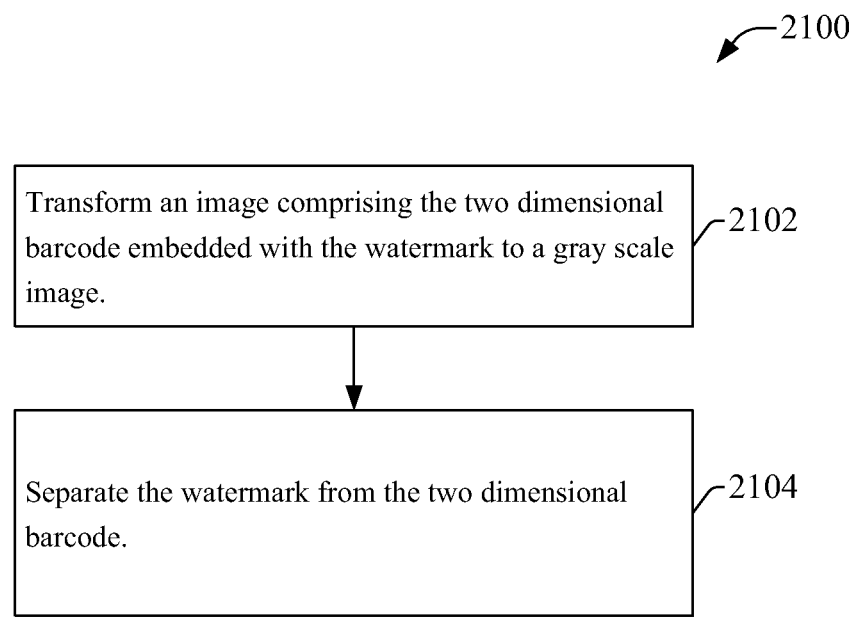
FIGS. 21 and 22 are example non-limiting process flow diagrams of methods that can facilitate separation of the image from the two dimensional barcode, according to an aspect or embodiment of the subject disclosure.
Figure 22:
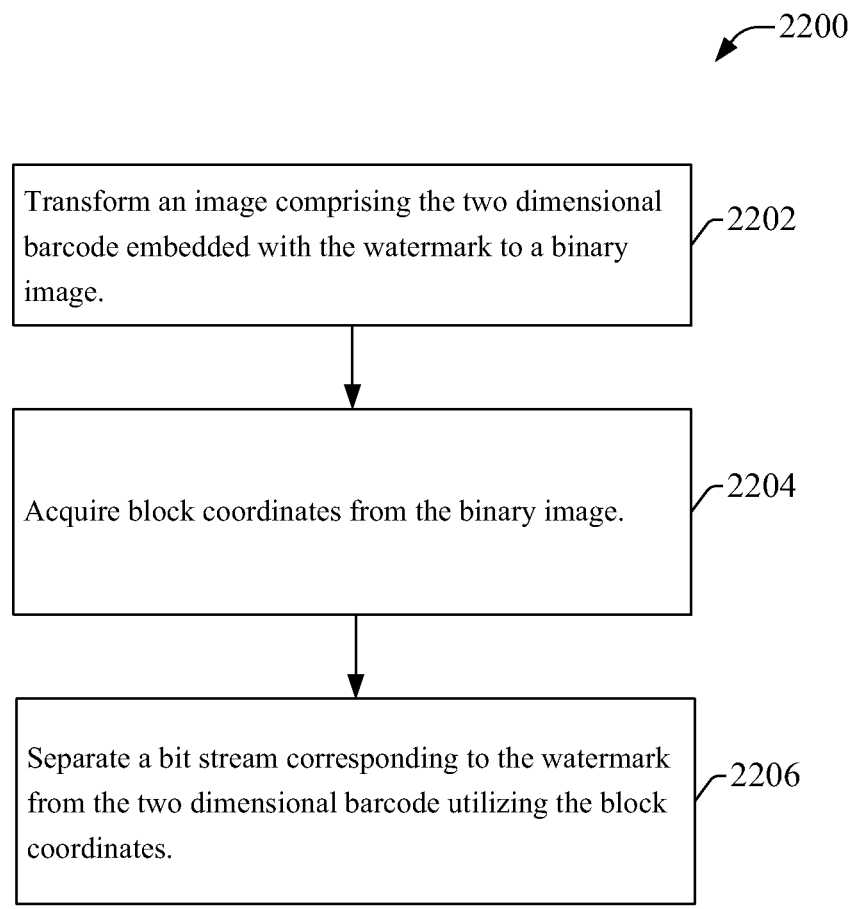

FIGS. 20-22 illustrate methods 2000-2200 that facilitate the decoding of a message encoded within a two dimensional barcode embedded with an image. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium, a computer readable device, or the like) to facilitate transporting and transferring such methodologies to computers. The term article of manufacture, as used herein, is intended to encompass a computer program accessible from any computer-readable device, carrier, or media, including a non-transitory computer readable storage medium. Any reference to a data store below can refer to a data store stored in a cloud computing environment. Additionally, all or part of the acts and/or steps described below can occur as a service distributed in a cloud computing environment.

FIG. 20 is an example non-limiting process flow diagram of a method 2000 that facilitates decoding a message encoded within the two dimensional barcode, according to an aspect or embodiment of the subject disclosure. At element 2002, a bit stream of a water mark can be separated from a two dimensional barcode. At element 2004, content represented by the two dimensional barcode can be decoded. At element 2006, a display of the message can be facilitated. For example, the message can be displayed in connection with the image. For example, the image and the message can be displayed together on the screen of a tablet computing device or mobile phone after separation and decoding.

FIGS. 21 and 22 are example non-limiting process flow diagrams of methods 2100 and 2200 that can facilitate separation of the image from the two dimensional barcode, according to an aspect or embodiment of the subject disclosure.

In FIG. 21, a gray scale image is described. At element 2102, an image including the two dimensional barcode embedded with the image can be transformed into a gray scale image. At element 2104, the watermark can be separated from the two dimensional barcode. In FIG. 22, a binary image is described. At element 2202, an image including the two dimensional barcode embedded with the watermark can be transformed to a binary image. At element 2204, block coordinates can be acquired from the binary image (e.g., coordinates of the beginning of each block in the x-direction and the y-direction using the broken line of the finder pattern). At element 2206, Separate a bit stream corresponding to the watermark from the two dimensional barcode utilizing the block coordinates. The block coordinates correspond to coordinates of the blocks within the broken border of the finder pattern.

Example Computing Devices

FIGS. 23 and 24 provide examples of different devices that can be used in the storage and execution of the systems and methods described herein. For example, FIG. 23 illustrates a mobile device 2300 that can detect and decode the two dimensional barcodes described herein and FIG. 24 illustrates a computing device 2400 that can create and display the two dimensional barcodes described herein.

Referring now to FIG. 23, illustrated is a schematic block diagram of an exemplary mobile device 2300 capable of executing the mobile applications or services described in accordance with some aspects and embodiments described herein. Although a mobile handset 2300 is illustrated herein, it will be understood that other devices can be a mobile device, and that the mobile handset 2300 is merely illustrated to provide context for the aspects and embodiments of the innovation described herein. Generally, the mobile handset 2300 refers to a smart phone. However, the mobile handset can be a tablet computing device with similar capabilities.

The following discussion is intended to provide a brief, general description of an example of a suitable environment 2300 in which the various aspects and embodiments can be implemented. While the description includes a general context of computer-executable instructions embodied on a computer readable storage medium, those skilled in the art will recognize that the innovation also can be implemented in combination with other program modules and/or as a combination of hardware and software.

Generally, mobile computing applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include or interface to a variety of computer-readable media or devices. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 2300 includes a processor 2302 for controlling and processing all onboard operations and functions. A memory 2304 interfaces to the processor 2302 for storage of data and one or more applications 2306 (e.g., a video player software, user feedback component software, etc.). Other applications can include voice recognition of predetermined voice commands that facilitate initiation of the user feedback signals. The applications 2306 can be stored in the memory 2304 and/or in a firmware 2308, and executed by the processor 2302 from either or both the memory 2304 or/and the firmware 2308. The firmware 2308 can also store startup code for execution in initializing the handset 2300. A communications component 2310 interfaces to the processor 2302 to facilitate wired/wireless communication with external systems, e.g., cellular networks, VoIP networks, and so on. Here, the communications component 2310 can also include a suitable cellular transceiver 2311 (e.g., a GSM transceiver) and/or an unlicensed transceiver 2313 (e.g., WiFi, WiMax) for corresponding signal communications. The handset 2300 can be a device such as a cellular telephone, a PDA with mobile communications capabilities, and messaging-centric devices. The communications component 2310 also facilitates communications reception from terrestrial radio networks (e.g., broadcast), digital satellite radio networks, and Internet-based radio services networks.

The handset 2300 includes a display 2312 for displaying text, images, video, telephony functions (e.g., a Caller ID function), setup functions, and for user input. For example, the display 2312 can also be referred to as a "screen" that can accommodate the presentation of multimedia content (e.g., music metadata, messages, wallpaper, graphics, etc.). The display 2312 can also display videos and can facilitate the generation, editing and sharing of video quotes. A serial I/O interface 2314 is provided in communication with the processor 2302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 2300, for example. Audio capabilities are provided with an audio I/O component 2316, which can include a speaker for the output of audio signals related to, for example, indication that the user pressed the proper key or key combination to initiate the user feedback signal. The audio I/O component 2316 also facilitates the input of audio signals through a microphone to record data and/or telephony voice data, and for inputting voice signals for telephone conversations.

The handset 2300 can include a slot interface 2318 for accommodating a SIC (Subscriber Identity Component) in the form factor of a card Subscriber Identity Module (SIM) or universal SIM 2320, and interfacing the SIM card 2320 with the processor 2302. However, it is to be appreciated that the SIM card 2320 can be manufactured into the handset 2300, and updated by downloading data and software.

The handset 2300 can process IP data traffic through the communication component 2310 to accommodate IP traffic from an IP network such as, for example, the Internet, a corporate intranet, a home network, a person area network, etc., through an ISP or broadband cable provider. Thus, VoIP traffic can be utilized by the handset 2300 and IP-based multimedia content can be received in either an encoded or decoded format.

A video processing component 2322 (e.g., a camera) can be provided for decoding encoded multimedia content. The handset 2300 also includes a power source 2324 in the form of batteries and/or an AC power subsystem, which power source 2324 can interface to an external power system or charging equipment (not shown) by a power I/O component 2326.

The handset 2300 can also include a video component 2330 for processing video content received and, for recording and transmitting video content. For example, the video component 2330 can facilitate the generation, editing and sharing of a display regarding outstanding obligations and/or available discounts. A location tracking component 2332 facilitates geographically locating the handset 2300 that can be used to create the paths to satisfaction of the obligations. As described hereinabove, this can occur when the user initiates the feedback signal automatically or manually. A user input component 2334 facilitates the user initiating the quality feedback signal. The user input component 2334 can also facilitate the acceptance of various discounts and obligations. The user input component 2334 can include such conventional input device technologies such as a keypad, keyboard, mouse, stylus pen, and/or touch screen, for example.

Referring again to the applications 2306, a hysteresis component 2336 facilitates the analysis and processing of hysteresis data, which is utilized to determine when to associate with the access point. A software trigger component 2338 can be provided that facilitates triggering of the hysteresis component 2338 when the WiFi transceiver 2313 detects the beacon of the access point. A SIP client 2340 enables the handset 2300 to support SIP protocols and register the subscriber with the SIP registrar server.

The handset 2300, as indicated above related to the communications component 2310, includes an indoor network radio transceiver 2313 (e.g., WiFi transceiver). This function supports the indoor radio link, such as IEEE 802.11, for the dual-mode GSM handset 2300. The handset 2300 can accommodate at least satellite radio services through a handset that can combine wireless voice and digital radio chipsets into a single handheld device.

Referring now to FIG. 24, there is illustrated a block diagram of a computer operable to execute a system architecture that facilitates satisfaction of a commitment in connection with a loyalty program. The computer can provide networking and communication capabilities between a wired or wireless communication network and a server and/or communication device. In order to provide additional context for various aspects thereof, FIG. 24 and the following discussion are intended to provide a brief, general description of a suitable computing environment 2400 in which the various aspects of the innovation can be implemented to facilitate the satisfaction of an obligation. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 24, the exemplary environment 2400 for implementing various aspects described herein includes a computer 2402, the computer 2402 including a processing unit 2404, a system memory 2406 and a system bus 2408. The system bus 2408 couples system components including, but not limited to, the system memory 2406 to the processing unit 2404. The processing unit 2404 can be any of various commercially available processors. Dual microprocessors and other multi processor architectures can also be employed as the processing unit 2404.

The system bus 2408 can be any of several types of bus structure that can further interconnect to a memory bus (with or without a memory controller), a peripheral bus, and a local bus using any of a variety of commercially available bus architectures. The system memory 2406 includes read-only memory (ROM) 2410 and random access memory (RAM) 2412. A basic input/output system (BIOS) is stored in a non-volatile memory 2410 such as ROM, EPROM, EEPROM, which BIOS contains the basic routines that help to transfer information between elements within the computer 2402, such as during start-up. The RAM 2412 can also include a high-speed RAM such as static RAM for caching data.

The computer 2402 further includes an internal hard disk drive (HDD) 2414 (e.g., EIDE, SATA), which internal hard disk drive 2414 can also be configured for external use in a suitable chassis (not shown), a magnetic floppy disk drive (FDD) 2416, (e.g., to read from or write to a removable diskette 2418) and an optical disk drive 2420, (e.g., reading a CD-ROM disk 2422 or, to read from or write to other high capacity optical media such as the DVD). The hard disk drive 2414, magnetic disk drive 2416 and optical disk drive 2411 can be connected to the system bus 2408 by a hard disk drive interface 2424, a magnetic disk drive interface 2426 and an optical drive interface 2428, respectively. The interface 2424 for external drive implementations includes at least one or both of Universal Serial Bus (USB) and IEEE 2494 interface technologies. Other external drive connection technologies are within contemplation of the subject innovation.

The drives and their associated computer-readable media provide nonvolatile storage of data, data structures, computer-executable instructions, and so forth. For the computer 2402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 2412, including an operating system 2430, one or more application programs 2432, other program modules 2434 and program data 2436. All or portions of the operating system, applications, modules, and/or data can also be cached in the RAM 2412. It is to be appreciated that the innovation can be implemented with various commercially available operating systems or combinations of operating systems.

A user can enter commands and information into the computer 2402 through one or more wired/wireless input devices, e.g., a keyboard 2438 and a pointing device, such as a mouse 2440. Other input devices (not shown) may include a microphone, an IR remote control, a joystick, a game pad, a stylus pen, touch screen, or the like. These and other input devices are often connected to the processing unit 2404 through an input device interface 2442 that is coupled to the system bus 2408, but can be connected by other interfaces, such as a parallel port, an IEEE 2494 serial port, a game port, a USB port, an IR interface, etc.

A monitor 2444 or other type of display device is also connected to the system bus 2408 through an interface, such as a video adapter 2446. In addition to the monitor 2444, a computer typically includes other peripheral output devices (not shown), such as speakers, printers, etc.

The computer 2402 can operate in a networked environment using logical connections by wired and/or wireless communications to one or more remote computers, such as a remote computer(s) 2448. The remote computer(s) 2448 can be a workstation, a server computer, a router, a personal computer, portable computer, microprocessor-based entertainment appliance, a peer device or other common network node, and typically includes many or all of the elements described relative to the computer 2402, although, for purposes of brevity, only a memory/storage device 2450 is illustrated. The logical connections depicted include wired/wireless connectivity to a local area network (LAN) 2452 and/or larger networks, e.g., a wide area network (WAN) 2454. Such LAN and WAN networking environments are commonplace in offices and companies, and facilitate enterprise-wide computer networks, such as intranets, all of which may connect to a global communications network, e.g., the Internet.

When used in a LAN networking environment, the computer 2402 is connected to the local network 2452 through a wired and/or wireless communication network interface or adapter 2456. The adapter 2456 may facilitate wired or wireless communication to the LAN 2452, which may also include a wireless access point disposed thereon for communicating with the wireless adapter 2456.

When used in a WAN networking environment, the computer 2402 can include a modem 2458, or is connected to a communications server on the WAN 2454, or has other means for establishing communications over the WAN 2454, such as by way of the Internet. The modem 2458, which can be internal or external and a wired or wireless device, is connected to the system bus 2408 through the serial port interface 2442. In a networked environment, program modules depicted relative to the computer 2402, or portions thereof, can be stored in the remote memory/storage device 2450. It will be appreciated that the network connections shown are exemplary and other means of establishing a communications link between the computers can be used.

The computer 2402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11(a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated aspects and embodiments, including what is described in the Abstract, is not intended to be exhaustive or to limit the disclosed aspects and embodiments to the precise forms disclosed. While specific aspects and embodiments and examples are described herein for illustrative purposes, various modifications are possible that are considered within the scope of such aspects and embodiments and examples, as those skilled in the relevant art can recognize.

As used herein, the word "example" is used herein to mean serving as an example, instance, or illustration. For the avoidance of doubt, the subject matter described herein is not limited by such examples. In addition, any aspect or design described herein as an "example" is not necessarily to be construed as preferred or advantageous over other aspects or designs, nor is it meant to preclude equivalent structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In this regard, while the described subject matter has been described in connection with various aspects and embodiments and corresponding Figures, where applicable, it is to be understood that other similar aspects and embodiments can be used or modifications and additions can be made to the described aspects and embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims.

What is claimed is:

1. A system, comprising:
    a memory to store computer-executable instructions; and
    a processor that executes or facilitates execution of the computer-executable instructions to at least:
        encode a message within a two dimensional barcode;
        embed a gray scale image into the two dimensional barcode to form a watermarked barcode via a watermarking that employs at least two tiling patterns; and
        add a finder pattern with markings at all four corners of the finder pattern to the watermarked barcode.

2. The system of claim 1, wherein the watermarking comprises:
    extraction of a block that is determined to represent at least one bit of data from the gray scale image;
    comparison of the block to one of the at least two tiling patterns based on a value of the at least one bit of data represented by the block; and
    setting a gray scale value for first pixels within the block based on the comparison between the first pixels within the block to second pixels within the one of the at least two tiling patterns.

3. The system of claim 2, wherein the comparison further comprises a pixel by pixel comparison between the first pixels within the block the second pixels within the one of the at least two tiling patterns, wherein
    when a pixel within the first pixels within the block and a corresponding pixel within the second pixels within the one of the at least two tiling patterns are at a first high intensity, the gray scale value is set to the first high intensity;
    when the pixel within the first pixels within the block are at the first high intensity and the corresponding pixel within the second pixels within the one of the at least two tiling patterns are at a first low intensity, the gray scale value is set to a second high intensity, wherein the second high intensity is lower than the first high intensity;
    when the pixel within the first pixels within the block are at the first low intensity and the corresponding pixel within the second pixels within the one of the at least two tiling patterns are the first high intensity, the gray scale value is set to a second low intensity, wherein the second low intensity is higher than the first low intensity; and
    when the pixel within the first pixels within the block and the corresponding pixel within the second pixels within the one of the at least two tiling patterns are at a first low intensity, the gray scale value is set to the first low intensity.

4. The system of claim 1, wherein the processor further executes or facilitates execution of the computer-executable instructions to add color to the watermarked barcode according to a color scale based on a comparison between a pixel from the two dimensional barcode and a corresponding pixel of the gray scale image.

5. The system of claim 1, wherein the message is encoded with a declaration of an error prone edge block that facilitates the use of an erasure-and-error correction decoding algorithm.

6. A method, comprising:
    encoding, by a system comprising a processor, a text message into binary form;
    generating, by the system, an error correction code;
    converting, by the system, a color image into a gray scale image;
    embedding, by the system, the gray scale image into a bar code, comprising the binary form text message and the error correction code;
    converting, by the system, the gray scale image within the bar code into a color image; and
    adding, by the system, a finder pattern to the bar code with the color image.

7. The method of claim 6, wherein the finder pattern comprises markings at all four corners of the bar code.

8. The method of claim 6, wherein the image comprises a logo image or a cartoon image.

9. The method of claim 6, wherein the image comprises a photograph of a human face.

10. The method of claim 9, further comprising pre-processing, by the system, the photograph of the human face to increase quality of the image.

11. The method of claim 10, wherein the pre-processing comprises increasing a contrast of portions of the image corresponding to the human face.

12. The method of claim 11, wherein the pre-processing further comprises rescaling an intensity of the portions of the image corresponding to the human face.

13. The method of claim 11, wherein the pre-processing further comprises searching the image for regions of pixels satisfying a color condition, wherein the color condition comprises the green component and the blue component having a higher contribution to the gray scale image than the red component.

14. The method of claim 11, wherein the pre-processing further comprises:
   converting the image from color to a gray scale image;
   generating a histogram of gray level distribution related to the gray scale image;
   equalizing the histogram;
   searching the equalized histogram for pixels satisfying a color condition indicating a yellow color of a face; and
   enhancing an intensity of the pixels satisfying the color condition in the color image.

15. The method of claim 14, wherein the enhancing further comprises increasing an intensity of pixels satisfying the color condition with a high intensity and decreasing an intensity of pixels satisfying the color condition with a low intensity.

16. A computer readable storage device comprising computer-executable instructions that, in response to execution, cause a system comprising a processor to perform operations, comprising:
   receiving a picture comprising a two dimensional barcode embedded with an image and a finder pattern comprising a broken border;
   extracting a first number of blocks in a row and a second number of blocks in a column corresponding to the broken border;
   locating coordinates of the first number of blocks in the row and the second number of blocks in the column;
   scaling each of the first number of blocks in the row and the second number of blocks in the column to a standard size based on the coordinates of the first number of blocks in the row and the second number of blocks in the column; and
   extracting a message from the two dimensional barcode.

17. The computer readable storage device of claim 16, wherein the extracting comprises:
   extracting blocks from the picture of the two dimensional barcode;
   dividing each block into a border area and a center area;
   determining a maximum gray level value and a minimum gray level value inside the border area to facilitate detection of an edge block,
   wherein the edge block is on an edge of the image embedded within the barcode.

18. The computer readable storage device of claim 17, wherein the determining comprises:
   determining a difference between the maximum and minimum gray level values inside the border area;
   comparing the difference to a threshold intensity value; and
   labeling a block as the edge block when the difference is greater than the threshold intensity.

19. The computer readable storage device of claim 18, wherein the labeling facilitates application of an error-and-erasures correcting decoding algorithm for the extracting of the message.

20. The computer readable storage device of claim 18, wherein the operations further comprise:
   determining a maximum and a minimum gray level values inside the center area; and
   determining a second difference between the maximum and minimum gray level values inside the center area;
   comparing the second difference to the threshold intensity value;
   labeling a block as the edge block when the second difference is greater than the threshold intensity.

* * * * *